United States Patent
Miller et al.

(10) Patent No.: US 10,110,511 B2
(45) Date of Patent: Oct. 23, 2018

(54) RESOURCE PRIORITIZATION AND COMMUNICATION-CHANNEL ESTABLISHMENT

(71) Applicant: LIVEPERSON, INC., New York, NY (US)

(72) Inventors: Grant Lawrence Miller, Los Angeles, CA (US); Marc Campbell, Los Angeles, CA (US)

(73) Assignee: LIVEPERSON, INC., New York, NY (US)

( * ) Notice: Subject to any disclaimer, the term of this patent is extended or adjusted under 35 U.S.C. 154(b) by 213 days.

(21) Appl. No.: 15/071,486

(22) Filed: Mar. 16, 2016

(65) Prior Publication Data

US 2016/0277315 A1    Sep. 22, 2016

Related U.S. Application Data

(60) Provisional application No. 62/133,670, filed on Mar. 16, 2015.

(51) Int. Cl.
*H04L 29/08* (2006.01)
*H04L 12/911* (2013.01)
*G06F 17/30* (2006.01)

(52) U.S. Cl.
CPC ........ *H04L 47/821* (2013.01); *G06F 17/3087* (2013.01); *H04L 67/18* (2013.01); *H04L 67/322* (2013.01); *H04L 67/327* (2013.01); *H04L 67/14* (2013.01)

(58) Field of Classification Search
CPC ..... H04L 67/322; H04L 67/14; H04L 67/327; H04L 47/821; H04L 67/18; G06F 17/3087; G06F 17/3033; G06F 12/121; G06F 12/123
USPC ....................................................... 709/226
See application file for complete search history.

(56) References Cited

U.S. PATENT DOCUMENTS

2010/0329198 A1    12/2010    Madan et al.
2014/0122698 A1    5/2014    Batrouni et al.
2014/0245141 A1    8/2014    Yeh et al.

OTHER PUBLICATIONS

International Search Report and Written Opinion of the International Searching Authority for PCT Application No. PCT/US2016/022574, dated Jun. 9, 2016, 12 pages.

*Primary Examiner* — Tu Nguyen
(74) *Attorney, Agent, or Firm* — Polsinelli LLP

(57) ABSTRACT

A resource prioritization system and method for processing request communications by prioritizing resources based on obtainment parameters and establishing communication channels. The resource prioritization system and method may receive a request from a user device. The request can include content related to a request specification and can be associated with a request location. The resource prioritization system and method can process the request to identify one or more resources having one or more characteristics corresponding to the request content and associated with resource locations near the user location. A communication channel can then be established between the user device and a device associated with an identified resource, such that the user can submit queries to the resource and receive query responses.

20 Claims, 20 Drawing Sheets

RESOURCE PRIORITIZATION AND COMMUNICATION-CHANNEL ESTABLISHMENT

CROSS REFERENCE TO RELATED APPLICATIONS

This application claims the benefit of and the priority to U.S. Provisional Application No. 62/133,670, filed on Mar. 16, 2015, which is hereby incorporated by reference in its entirety for all purposes.

FIELD

The present disclosure relates generally to processing of request communications by prioritizing resources based on obtainment parameters and establishing communication channels.

BACKGROUND

Frequently, matching resource allocations to resource requests is a complex endeavor. In some instances, availability of resources may be constrained and thus is insufficient to respond to a request load. Further complicating matters, a degree to which a resource corresponds to a request may vary across a spectrum. Thus, serving a plurality of requests may require evaluating, not only resources' availability, but also resources' specifications, locations or other parameters. There is a need to improve resource-allocation efforts.

SUMMARY

In some embodiments, a request is received from a user device, and a determination is made as to whether to provide a resource responsive to the request, and if so, which resource is provided. For example, an app or webpage may be presented at a display of a user device, and input can be detected that corresponds to a request to communicate with a resource device to (for example) receive more information related to the app, web page, or URL (e.g., about a content item depicted or otherwise identified on an app page, an object's obtainability (e.g., availability), navigation (e.g., to get to a building or within a building), a service (e.g., a requested performance), a requested performance's obtainability, a pendency time). A request communication can be generated that includes content corresponding to the request, an identifier corresponding to the app or URL and/or a location of the user device. In some instances, the request communication identifies a content item, which may include one specified via user input and/or one corresponding to a web page or app page being presented concurrently or just prior to receiving the user input. The request communication can be received at a resource prioritizing system.

The resource prioritizing system can first identify an object corresponding to the request. The object can include, for example, a building (e.g., a building of interest, a store, an object in the building, or other suitable objects). The object can include one identified in the request communication or one associated with content in the request communication. For example, a request can be to receive information about an oil change, and an object can be identified as "Mechanic".

The resource prioritizing system can then identify one or more resource devices associated with the object. The resources can include, for example, agent devices associated with an entity (e.g., a client) corresponding to the object, (e.g., agents of a building corresponding to the object and/or agents of a building in which the object is located), agents that are on duty, or agent devices that are within a particular distance from the object or are at an object location (e.g., in an identified building), or other suitable resources.

Data corresponding to the request, the object and/or the identified resource device(s) can be processed to determine whether to attempt to connect a user with a resource device in response to the request, which resource device to attempt connection with and/or a connection type. For example, if a set of resources are in a building, a particular resource can be (preliminarily or finally) identified to communicate with a user (e.g., via a phone call, text message communications or chat) based on where each of the set of resources are located (e.g., relative to a location of the object) and/or whether each of the set of resources is identified as being involved in another communication or task. As another example, a type of communication (e.g., electronic chat, phone call or text message) can be identified based on an inclination (e.g., preference) of the resource associated with the resource device, an obtainment indication (e.g., identify an outcome probability of obtainment), and/or a request-response task time range.

When it is determined that a resource is to be provided in response to the request (e.g., that a communication channel is to be established between the user device and a resource device corresponding to a request-associated object or of another user located near the request-associated object), a communication channel can be established and initiated between the devices (e.g., by initiating a call, online chat, or message communications). In some instances, such channel initiation is conditioned upon having received a positive response (or not having received a negative response) to an invitation or notification that may have been sent to one or both of the devices to confirm availability to participate in a communication.

Certain aspects and features of the present disclosure relate to prioritizing resources. A resource prioritizing system can receive a request from a user device. The request can include content related to a request specification and can be associated with a request location. A resource prioritization system can process the request to identify one or more resources having one or more characteristics corresponding to the request content and associated with resource locations near the user location.

For example, a content analysis engine can process the content to identify one or more object tags related to the content. Further, a location detection engine can detect a request location associated with the request (e.g., based on data in or metadata associated with the request). An object engine can use the tags and request location to identify one or more objects associated with the tag(s) and associated with a similar location. Each object can be associated with one or more resources, such that one or more resources (associated with the identified one or more objects) can be identified for a request.

A request-handling engine can assign a value to each identified resource based on, for example, a location of the resource (e.g., relative to a request location or location of an object), tag weights (e.g., indicating a degree to which an object associated with the resource corresponds to a tag and/or a degree to which request content corresponds to the tag) and/or one or more other factors. In one instance, the value may also or alternatively be based on data corresponding to similar or same object characteristics, resource specifications, time ranges, and/or request locations. For example, the value may depend on obtainment data indicating an obtainment magnitude and/or probability associated with requests corresponding to a similar or same object for which a resource was provided and/or an obtainment magnitude and/or probability associated with requests corresponding to a similar or same object for which a resource was not provided.

As another example, the value may depend on predicted (e.g., indicated) request-response task time ranges, which may be determined based on calculations (e.g., estimations) of prior request-response task time ranges relating to a similar or same object and/or resource. The values can be used to determine, for example, whether any resource is to be provided in response to the request; which resource is to be provided in response to the request and/or how a resource is to be provided to respond to the request.

When it is determined that a resource is to be provided in response to a request, a communication can be transmitted to a device of an identified resource to confirm an availability of the resource. If a response is received that is indicative of the resource being unavailable, the resource may be removed from an identified set and/or a determination can be made again as to whether any resource and/or which resource is to be provided. If a response is received that is indicative of the resource being available (or if resource availability is not evaluated), a communication channel can be established between the user device and a resource device.

Disclosed resource-allocation techniques can allow a user to communicate with an agent device physically located in or near an object, such that (for example) an object can be examined in real-time in response to particular queries from the user. Meanwhile, techniques further allow for efficient management of requests, such that resources can be provided (for example) in a manner to bias towards (e.g., weighted to favor selection, resource selection weighting towards) a larger number of request obtainments (e.g., a particular event performed by a user) and/or a higher obtainment magnitude (e.g., an obtainment magnitude associated with the particular event).

In some embodiments, a resource prioritization system for facilitating responding to request communications by prioritizing resources and establishing communication channels is provided. The resource prioritization system may include an interface engine system, a location detection engine, an object engine, a scheduling engine, an obtainment analysis engine, and a request handling engine. The interface engine system can receive a request communication from a device. For example, the request communication may include location data indicative of a location and request content corresponding to an object. The location detection engine can identify a request location based on the location data. For example, the request location can be indicative of a location of the device. The object engine can identify an identifier of an object or of an object type based on the request content, and identify one or more object locations based on the identifier of an object or of an object type and the request location.

The scheduling engine, using one or more processors, can: identify a set of resources, identify a resource location associated with each resource in the set of resources, assign, for each resource in the set of resources, a prioritization value to the resource, wherein the prioritization value depends on the resource location associated with the resource, and select a resource from amongst the set of resources to at least partly respond to the request communication, wherein the selection of the resource is based on the assigned prioritization values. Further, the scheduling engine can identify a set of communication types, wherein at least one communication type includes communication over a voice, data or text communication channel, and select a communication type from amongst the set of communication types, wherein the selection of the communication type is based on an obtainment statistic associated with the request communication. For example, an obtainment statistic can be a obtainment parameter, as used herein.

The obtainment analysis engine can identify the obtainment parameter associated with the request communication based on obtainment data relating to previous request communications that is indicative of whether obtainments occurred or values of obtainments. The request handling engine can, when the selected communication type includes communication over a voice, data or text communication channel, facilitate establishment of the voice, data or text communication channel between the device and a resource device associated with the selected resource.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures.

DETAILED DESCRIPTION

Figure 1:
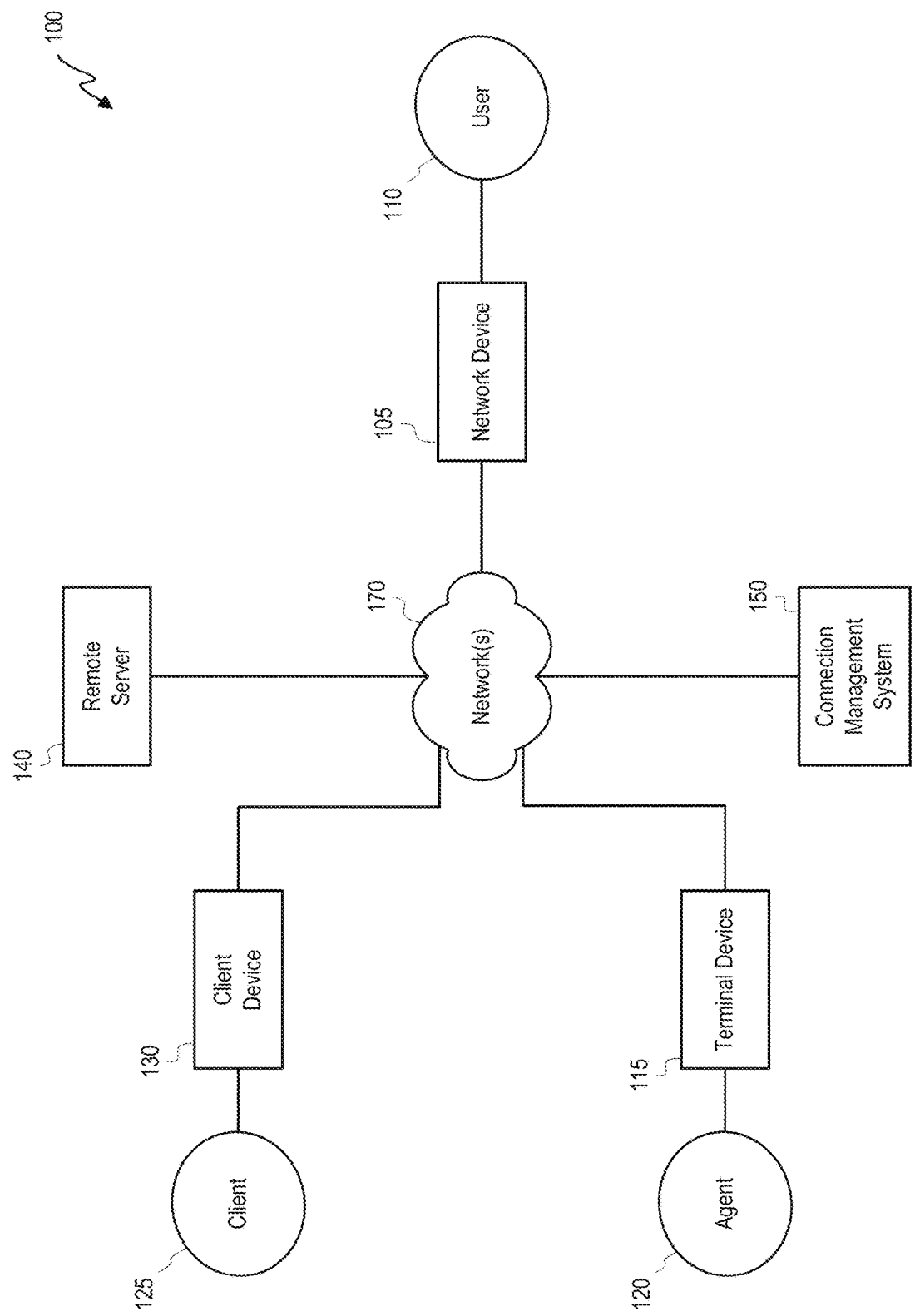
FIG. 1 shows a block diagram of an embodiment of a network interaction system.

In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it would be appreciated that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process that is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable storage medium or computer-readable storage medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

Certain aspects and features of the present disclosure relate to prioritizing and selecting geographically diverse resources to respond to a request via establishment of communication channels. For example, a request can be received (from a user device) that includes content corresponding to an object or type of object. The request can be associated with a request location. A data store can be queried to identify one or more objects corresponding to the request and associated with a location geographically near the request location. Resources associated with the objects can be subsequently identified. A communication channel can then be established between the user device and a device associated with an identified resource, such that (for example) the user can submit queries to the resource and receive query responses.

For example, a user may access, via a user device (e.g., smart phone), a URL (e.g., associated with a particular entity or client, such as a store) that includes information about one or more objects. A user may enter input at the user device corresponding to a request to communicate with a resource about the object(s) and/or client. A request communication can then be generated that identifies the one or more objects, a location of the user device and/or an client (e.g., a building associated with the client) associated with the URL or web page. The communication can be sent to a remote server, which can identify one or more objects and/or entities corresponding to the requests and having a location near the location of the user device (e.g., within a particular distance or area or being amongst a predetermined number of nearest objects and/or entities). The server can identify another device at or near the location of one of the identified object or building, such as a mobile device of a resource, or a mobile device of another user. The server can then facilitate connecting the user device to the other device via a communication channel, such that the user can communicate (e.g., in real-time, such as via a phone call or chat) with a person knowledgeable about the objects and/or client and geographically proximate to the user. This location parameter can provide an advantage in that the person can provide information about an object that is reasonably accessible for the user to physically visit.

As another example, a user may open a theme park app on a user device. The app may allow the user to enter input corresponding to a request to speak to someone about any of various topics, such as park navigation. Each request type can be associated with an object, such as park navigation being associated with a park-information center. A single theme park can include multiple objects of a given type (e.g., multiple information centers). A request communication can identify a request type (or corresponding object type) and a location of the user device. A server can receive the request communication and identify an object near (e.g., within a particular distance, nearest object or being amongst a number of nearest objects) to the location of the user device. The server can then establish a communication channel between a device at a location of the identified office (e.g., a park-information center phone) and the user device. The user can then, for example, communicate with a resource at the park-information center via a chat or phone call.

Embodiments discussed herein facilitate establishment of communication channels between user devices and resource devices. Such channels can enable, for example, queries to be transmitted from a user device to a resource device and a query response to be transmitted from the resource device to the user device. Such queries can, for example, relate to an object, which may be geographically near the resource device (e.g., such that the resource can assess and evaluate the object in view of the query). In various instances, the resource can include a computational resource, a robot or a human. The resource can be mobile. The resource can include one that is to have information (or to have access to information) about the object. In some instances, the resource and object are associated with a same client. For example, a client may own both the resource and object, or a client may be providing an object and the resource may be a resource or agent of the client.

In some instances, a variety of resource types and/or types of communication channels are available and/or selected between for a request. For example, a set of resource types can include two or more of: a resource located near an object; a remote resource; a resource having a specification or knowledge base (e.g., base of information) corresponding to a particular object or object type; a resource not having a specification or knowledge base corresponding to a particular object or object type; a human resource; a robotic resource; and a machine resource (e.g., an automated attendant system or recording system). For a particular request, one or more resource types can be selected based on, for example, a priority assigned to the request, a request load, an availability of various resources and/or a type of information. As another example, a set of communication channel types can include a phone-call channel, a virtual chat channel, and/or a message-interaction channel. For a particular request, a communication channel type can be identified, for example, based on a priority of the request, a request load, an availability of various resources, an inclination of a user and/or resource, and/or a capability of a user device and/or resource device to support communication via different communication channel types.

As one example, a resource type may be selected based on a determination as to whether an object is available at a location within a distance (e.g., a defined distance or distance range) from a location of a user device. When a request-associated object is located within the distance, a selection of a resource can weighted towards selection of a resource type that is near the object and/or the user device. Otherwise, a selection may have no resource-type selection weighting or could have a resource selection weighting towards a remote resource type. To illustrate, a request from a user device may be for information about a particular object associated with an client. An client near a location of the user device can be identified, and it can be determined that the object is unavailable (e.g., no longer located in a building associated with the client). Given this determination, a resource type that is remote from the building associated with the client (or remote from a location that would be associated with the object if the object were available) may be selected, such as an agent at a call center. The same result could occur when no resources are available at the building associated with the client to handle the request for information.

As another example, a resource type may be selected based on a distance between a user device and an object. For example, if a user device is within a distance from an object (e.g., in a building or within a number of feet from an object location), a selection of a weighting towards selecting a resource type that is near the object and/or user device may be higher than in other circumstances (and/or a weighting, such as a resource type having a specification corresponding to the request, can be lower than in other circumstance). To illustrate, a request communication that relates to an object can be received from a user device. It may be determined that no resource (or limited resources) having a proficiency or specification corresponding to the object is available (e.g., with a location corresponding to or near a location of the user device). Alternative resource types can include another resource (without the specification corresponding to the object) in the building associated with the client and another resource (e.g., with the specification) remote from the building associated with the client. When the user device is in or within a distance from the building associated with the client, a resource selection weighting for a resource in the building associated with the client may be higher than otherwise and/or resource selection weighting for a resource with the specification corresponding to the object may be lower than otherwise. In some examples, indoor proximity sensors in the building associated with the client may be used to provide guidance to helpful resources when the user device is located within the building.

In some embodiments, during resource prioritizing, one or more geographic locations and types of resources devices, objects and/or user devices are analyzed and evaluated, using data obtained and stored in real-time (or near real-time). This analysis and evaluation may be used to guide a user to resources and/or object. As used herein, the term real-time as it relates to an action taken in response to a particular event refers to taking the action in response to the particular event without added delay. For example, data obtained in real-time refers to obtaining data and making the data available without added delay. In some examples of the analyzing and evaluation of resources, delay may be added because data can be stored for a period of time after the data is obtained before the data is sent to for use by embodiments. Various details relating to examples of the various sensors, types of resources, and the use of one or more types of specialized devices are described below.

These illustrative examples are given to introduce the general subject matter discussed herein, and are not intended to limit the scope of the disclosed concepts. The following sections describe various features and examples with reference to the drawings, in which descriptions are used to describe the illustrative examples but, like the illustrative examples, should not be used to limit the present disclosure.

FIG. 1 shows a block diagram of an embodiment of a network interaction system 100 which implements and supports certain embodiments and features described herein. Certain embodiments relate to establishing a connection channel between a network device 105 (which can be operated by a user 110) and a terminal device 115 (which can be operated by an agent 120). An agent may also be referred to herein as a provider proxy. In certain embodiments, the network interaction system 100 can include a client device 130 associated with a client 125.

In certain embodiments, a user 110 can be a user browsing a web page or accessing a requested performance (e.g., a service) provided by a remote server 140. A client 125 can be an client that provides, operates, or runs the web page or the requested performance, or resources associated with or assigned by such an client to perform the tasks available to a client 125 as described herein. The agent 120 can be a resource, such as a support agent or associate tasked with providing support or information to the user 110 regarding the web page or requested performance (e.g., information about items available on the web page). Out of a large number of agents, a subset of agents may be appropriate for providing support or information for a particular client 125. The agent 120 may be associated or not associated with the client 125. Each agent can be associated with one or more clients 125. In some non-limiting examples, a user 110 can be searching the Internet using a computing device, a client 125 can be an client that provides published items, and an agent 120 can be associated with the client. In various embodiments, the user 110, client 125, and agent 120 can be other resources or entities.

While FIG. 1 shows only a single network device 105, terminal device 115 and client device 130, an interaction system 100 can include multiple or many (e.g., tens, hundreds or thousands) of each of one or more of these types of devices. Similarly, while FIG. 1 shows only a single user 110, agent 120 and client 125, an interaction system 100 can include multiple or many of each of one or more of such entities. Thus, it may be necessary to determine which terminal device is to be selected to communicate with a given network device. Further complicating matters, a remote server 140 may also be configured to receive and respond to select network-device communications.

A connection management system 150 can facilitate strategic routing of communications. A communication can include a message with content (e.g., determined based on input from an client, such as typed or spoken input). The communication can also include additional data, such as data about a transmitting device (e.g., an IP address, account or profile identifier, device type and/or operating system); a destination address; an identifier of a client; an identifier of a URL or URL element (e.g., a website or website element being visited when the communication was generated or otherwise associated with the communication) or online history data; a time (e.g., time of day and/or date); and/or destination address. Other information can be included in the communication. In some instances, connection management system 150 routes the entire communication to another device. In some instances, connection management system 150 modifies the communication or generates a new communication (e.g., based on the initial communication). The new or modified communication can include the message (or processed version thereof), at least some (or all) of the additional data (e.g., about the transmitting device, URL or previous online data and/or time) and/or other data identified by connection management system 150 (e.g., user data associated with a particular profile identifier or device). The new or modified communication can include other information as well.

Part of strategic-routing facilitation can include establishing, updating and using one or more connection channels between network device 105 and one or more terminal devices 115. For example, upon receiving a communication from network device 105, connection management system 150 can first determine to which client (if any) the communication corresponds. Upon identifying a client, connection management system 150 can identify a terminal device 115 associated with the client for communication with network device 105. In some instances, the identification can include evaluating a profile of each of a plurality of agents (or experts or delegates), each agent (e.g., agent 120) in the plurality of agents being associated with a terminal device (e.g., terminal device 115). The evaluation can relate to a content in a network-device message. The identification of the terminal device 115 can include a technique described, for example, in U.S. application Ser. No. 12/725,799, filed on Mar. 17, 2010, which is hereby incorporated by reference in its entirety for all purposes.

In some instances, connection management system 150 can determine whether any connection channels are established between network device 105 and a terminal device associated with the client (or remote server 140) and, if so, whether such channel is to be used to interchange a series of communications including the communication. This determination may depend, at least in part, on a topic associated with the communication, a sentiment (e.g., message characteristic) value associated with the communication or a past related communication, an indicated (e.g., relative or absolute) response latency for terminal device 115 and/or a type of communication channel associated with the communication (e.g., instant message, message, email, phone). Selecting an established communication channel may improve consistency and reduce the need to relay information from network device 105 multiple times. Meanwhile, determining that a new communication channel is to be established can facilitate quicker responses from more specialized agents.

A decision as to whether to select (or continue to use) an established communication channel and/or a selection of a new terminal device can include determining an extent to which each of one or more terminal devices (e.g., associated with a client) corresponds to a communication and/or an associated the user. Such correspondence can relate to, for example, an extent to which an agent's based of information corresponds to a communication topic, an availability of an agent at a given time and/or over a channel type, a language similarity between a user and agent, and/or a personality (e.g., a characteristic) analysis.

Connection management system 150 may use communication analyses to influence routing determinations (e.g., determining whether to route a communication to a terminal device having previously received a communication from a network device having transmitted the communication or selecting a terminal device to receive or transmit a communication). One communication analysis can include determining and assessing one or more categories or tags of a current or past communication or communication series. For example, a communication can be assigned a category for each of (for example) a topic, channel type (e.g., email, SMS message, real-time chat, phone call or asynchronous message), language, complexity level, message characteristic, and/or whether/which file type is attached, and a terminal-device selection can have a selection weighting towards terminal devices associated with similar, same or associated bases of information, channel-type availability, language, proficiency level, message characteristic, and/or file-type capabilities. Availability status data of an agent can also be analyzed to determine an appropriate terminal device. The communication analysis can include determining and applying a rule to the communication received from a device or application in order to influence routing determinations.

In some embodiments, connection management system 150 may include or be associated with a resource prioritization system (e.g., resource prioritization system 720 of FIG. 7, described herein), which can analyze data included in a communication received from network device 105. Based on the analysis of the data in the communication, the resource prioritization system can identify a location associated with network device 105. The resource prioritization system can select one or more terminal devices 115 based on a location associated with the one or more terminal device 115. For example, the resource prioritization system can select a terminal device geographically nearest to network device 105. In addition, the resource prioritization system can select a type of communication link to establish between network device 105 and the selected terminal device (e.g., the terminal device geographically nearest to network device 105). For example, the type of communication link can include communication over a voice, data, or text communication channel. In some examples, the type of communication link can be selected based on obtainment parameters, described herein. In other examples, the type of communication link can be selected based on the data included in the communication from network device 105.

Upon selecting a terminal device 115 to communicate with network device 105, connection management system 150 can establish a connection channel between the network device 105 and terminal device 115. In some instances, connection management system 150 can transmit a message to the selected terminal device 115. The message may request an acknowledgment of a proposed assignment to communicate with a network device 105 or identify that such an assignment has been generated. The message can include information about network device 105 (e.g., IP address, device type, and/or operating system), information about an associated user 110 (e.g., language spoken, time range of having interacted with client, proficiency level, message characteristic, and/or topic inclinations), a received communication, code (e.g., a selectable link or hyperlink) for generating and transmitting a communication to the network device 105, and/or an instruction to generate and transmit a communication to network device 105.

In one instance, communications between network device 105 and terminal device 115 can be routed through connection management system 150. Such a configuration can allow connection management system 150 to monitor the communication interchange and to detect issues (e.g., as defined based on rules) such as non-responsiveness of either device or extended latency. Further, such a configuration can facilitate selective or complete storage of communications, which may later be used, for example, to assess a quality of a communication interchange and/or to support learning to update or generate routing rules so as to improve particular post-communication targets.

In some embodiments, connection management system 150 can monitor the communications in real-time and perform automated actions (e.g., rule-based actions) based on the live communications. For example, when connection management system 150 determines that a communication relates to a particular item, connection management system 150 can automatically transmit an additional message to terminal device 115 containing additional information about the item (e.g., quantity of items in stock, links to support documents related to the item, or other information about the item or similar items).

In one instance, a designated terminal device 115 can communicate with network device 105 without relaying communications through connection management system 150. One or both devices 105, 115 may (or may not) report particular communication metrics or content to connection management system 150 to facilitate communication monitoring and/or data storage.

As mentioned, connection management system 150 may route select communications to a remote server 140. Remote server 140 can be configured to provide information in a predetermined manner. For example, remote server 140 may access one or more text passages, voice recording and/or files to transmit in response to a communication. Remote server 140 may select a particular text passage, recording or file based on, for example, an analysis of a received communication (e.g., a semantic or mapping analysis).

Routing and/or other determinations or processing performed at connection management system 150 can be performed based on rules and/or data at least partly defined by or provided by one or more client devices 130. For example, client device 130 may transmit a communication that identifies a prioritization of agents, terminal-device types, topic and/or proficiency similarity, or other suitable rules. As another example, client device 130 may identify one or more weights to apply to various variables possible impacting routing determinations (e.g., language compatibility, an indicated response time, device type and capabilities, and/or terminal-device load balancing). It will be appreciated that which terminal devices and/or agents are to be associated with a client may be dynamic. Communications from client device 130 and/or terminal devices 115 may provide information indicating that a given terminal device and/or agent is to be added or removed as one associated with a client. For example, client device 130 can transmit a communication with IP address and an indication as to whether a terminal device with the address is to be added or removed from a list identifying client-associated terminal devices.

In some examples, connection management system 150 can facilitate an initial comparison and routing between network device 105 and a first terminal device 115. For example, a message received in a communication from network device 105 can be routed to the first terminal device 115. As another example, communication management system 150 can transmit a communication to the first terminal device that includes or is indicative of a request or instruction to transmit a communication (e.g., initiating a communication session) to network device 105.

Each communication (e.g., between devices, between a device and connection management system 150, between remote server 140 and connection management system 150 or between remote server 140 and a device) can occur over one or more networks 170. Any combination of open or closed networks can be included in the one or more networks 170. Examples of suitable networks include the Internet, a personal area network, a local area network (LAN), a wide area network (WAN), or a wireless local area network (WLAN). Other networks may be suitable as well. The one or more networks 170 can be incorporated entirely within or can include an intranet, an extranet, or a combination thereof. In some instances, a network in the one or more networks 170 includes a short-range communication channel, such as a Bluetooth or a Bluetooth Low Energy channel. In one embodiment, communications between two or more systems and/or devices can be achieved by a secure communications protocol, such as secure sockets layer (SSL) or transport layer security (TLS). In addition, data and/or communication details may be encrypted based on any convenient, known, or to be developed manner, such as, but not limited to, Data Encryption Standard (DES), Triple DES, Rivest-Shamir-Adleman encryption (RSA), Blowfish encryption, Advanced Encryption Standard (AES), CAST- 128, CAST-256, Decorrelated Fast Cipher (DFC), Tiny Encryption Algorithm (TEA), eXtended TEA (XTEA), Corrected Block TEA (XXTEA), and/or RC5, etc.

A network device 105, terminal device 115 and/or client device 130 can include, for example, a portable electronic device (e.g., a smart phone, tablet, laptop computer, or smart wearable device) or a non-portable electronic device (e.g., one or more desktop computers, smart appliances, servers, and/or processors). Connection management system 150 can be separately housed from network, terminal and client devices or may be part of one or more such devices (e.g., via installation of an application on a device). Remote server 140 may be separately housed from each device and connection management system 150 and/or may be part of another device or system. While each device, server and system in FIG. 1 is shown as a single device, it will be appreciated that multiple devices may instead be used. For example, a set of network devices can be used to transmit various communications from a single user, or remote server 140 may include a server stack.

A software agent or application may be installed on and/or executable on a depicted device, system or server. In one instance, the software agent or application is configured such that various depicted elements can act in associated (e.g., complementary) manners. For example, a software agent on a device can be configured to obtain and transmit data about device usage to a separate connection management system, and a software application on the separate connection management system can be configured to receive and process the data.

Figure 2:
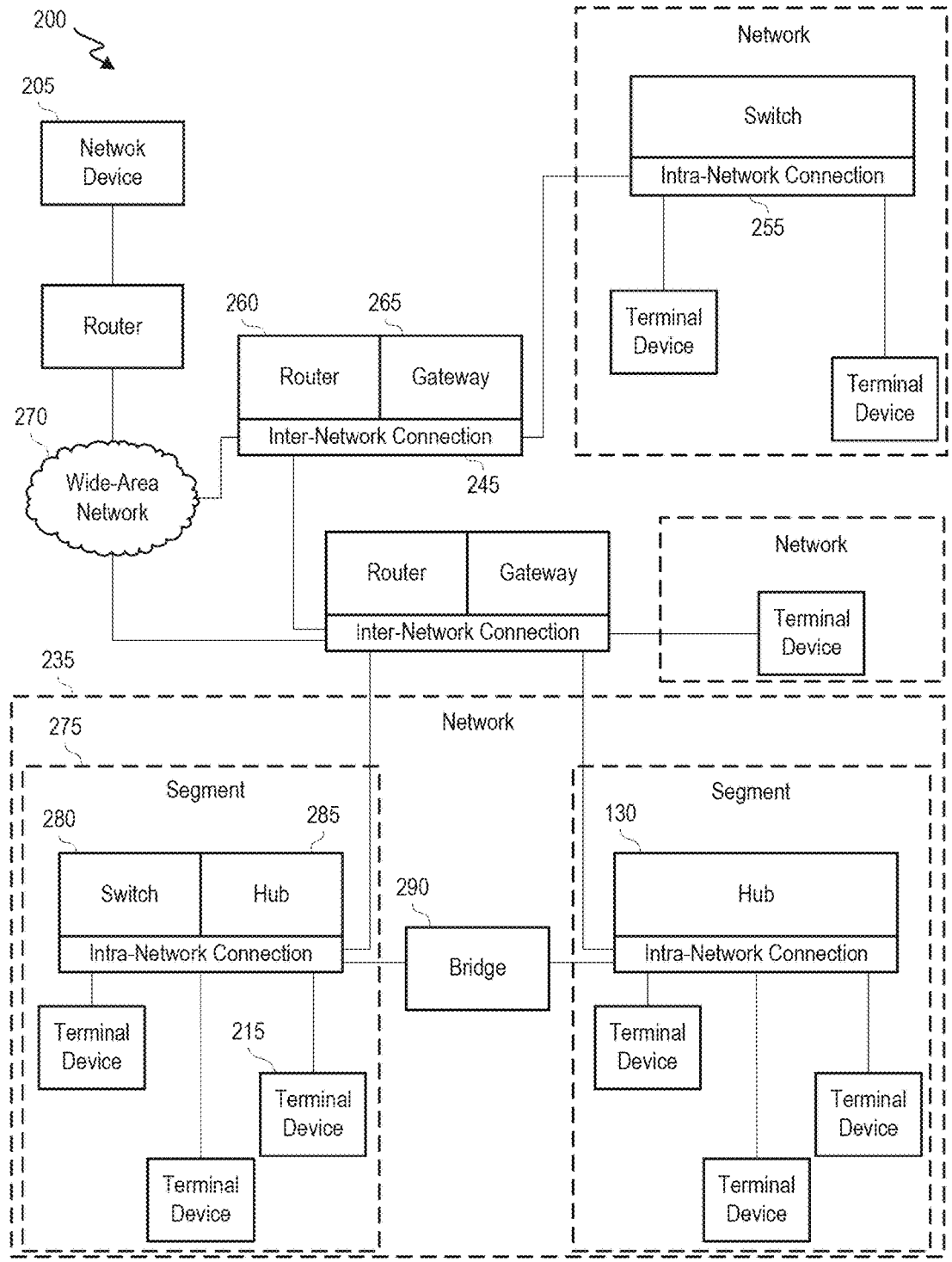
FIG. 2 shows a block diagram of another embodiment of a network interaction system.

FIG. 2 shows a block diagram of another embodiment of a network interaction system 200. Generally, FIG. 2 illustrates a variety of components configured and arranged to enable a network device 205 to communicate with one or more terminal devices 215. The depicted instance includes nine terminal devices 215 included in three local-area networks 235.

In some instances, a communication from network device 205 includes destination data (e.g., a destination IP address) that at least partly or entirely indicates which terminal device is to receive the communication. Network interaction system 200 can include one or more inter-network connection components 240 and/or one or more intra-network connection components 255 that can process the destination data and facilitate appropriate routing.

Each inter-network connection components 245 can be connected to a plurality of networks 235 and can have multiple network cards installed (e.g., each card connected to a different network). For example, an inter-network connection component 245 can be connected to a wide-area network 270 (e.g., the Internet) and one or more local-area networks 235. In the depicted instance, in order for a communication to be transmitted from network device 205 to any of the terminal devices, in the depicted system, the communication must be handled by multiple inter-network connection components 245.

When an inter-network connection component 245 receives a communication (or a set of packets corresponding to the communication), inter-network connection component 245 can determine at least part of a route to pass the communication to a network associated with a destination. The route can be determined using, for example, a routing table (e.g., stored at the router), which can include one or more routes that are pre-defined, generated based on an incoming message (e.g., from another router or from another device) or learned.

Examples of inter-network connection components 245 include a router 260 and a gateway 265. An inter-network connection component 245 (e.g., gateway 265) may be configured to convert between network systems or protocols. For example, gateway 265 may facilitate communication between Transmission Control Protocol/Internet Protocol (TCP/IP) and Internetwork Packet Exchange/Sequenced Packet Exchange (IPX/SPX) devices.

Upon receiving a communication at a local-area network 235, further routing may still need to be performed. Such intra-network routing can be performed via an intra-network connection component 255, such as a switch 280 or hub 285. Each intra-network connection component 255 can be connected to (e.g., wirelessly or wired, such as via an Ethernet cable) multiple terminal devices 215. Hub 285 can be configured to repeat all received communications to each device to which it is connected. Each terminal device can then evaluate each communication to determine whether the terminal device is the destination device or whether the communication is to be ignored. Switch 280 can be configured to selectively direct communications to only the destination terminal device.

In some instances, a local-area network 235 can be divided into multiple segments, each of which can be associated with independent firewalls, security rules and network protocols. An intra-network connection component 255 can be provided in each of one, more or all segments to facilitate intra-segment routing. A bridge 280 can be configured to route communications across segments 275.

To appropriately route communications across or within networks, various components analyze destination data in the communications. For example, such data can indicate which network a communication is to be routed to, which device within a network a communication is to be routed to or which communications a terminal device is to process (versus ignore). However, in some instances, it is not immediately apparent which terminal device (or even which network) is to participate in a communication from a network device.

To illustrate, a set of terminal devices may be configured so as to provide similar types of responsive communications. Thus, it may be expected that an inquiry in a communication from a network device may be responded to in similar manners regardless to which network device the communication is routed. While this assumption may be true at a high level, various details relating to terminal devices can give rise to particular routings being advantageous as compared to others. For example, terminal devices in the set may differ from each other with respect to (for example) which communication channels are supported, geographic and/or network proximity to a network device and/or characteristics of associated agents (e.g., bases of information, experience, languages spoken, availability, general characteristic or message characteristic, etc.). Accordingly, select routings may facilitate faster responses that more accurately and/or completely respond to a network-device communication. A complication is that static routings mapping network devices to terminal devices may fail to identify variations in communication topics, channel types, agent availability, and so on.

Figure 3A:
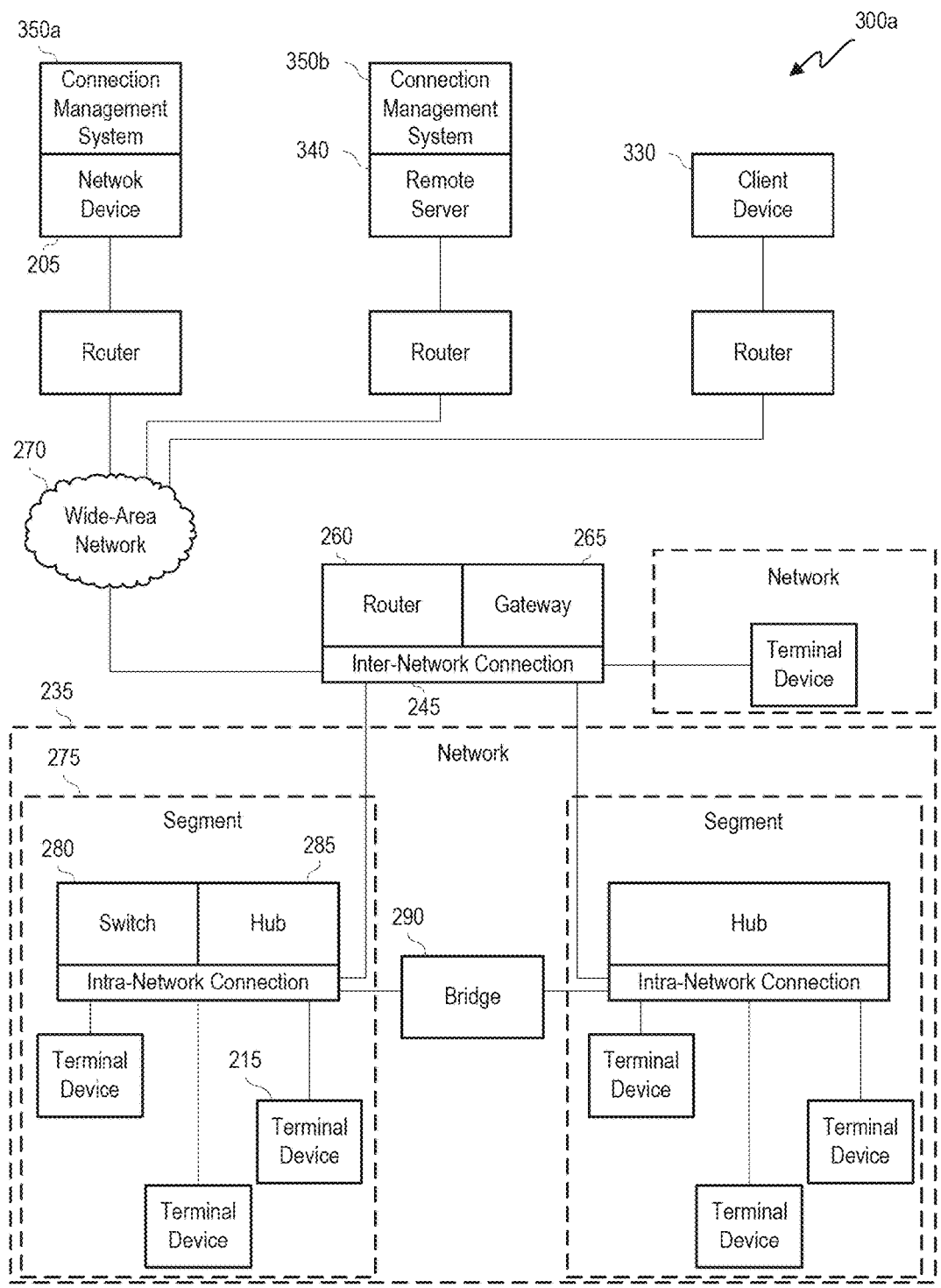
FIGS. 3A-3C show block diagrams of other embodiments of a network interaction system that includes a connection management system.
Figure 3B:
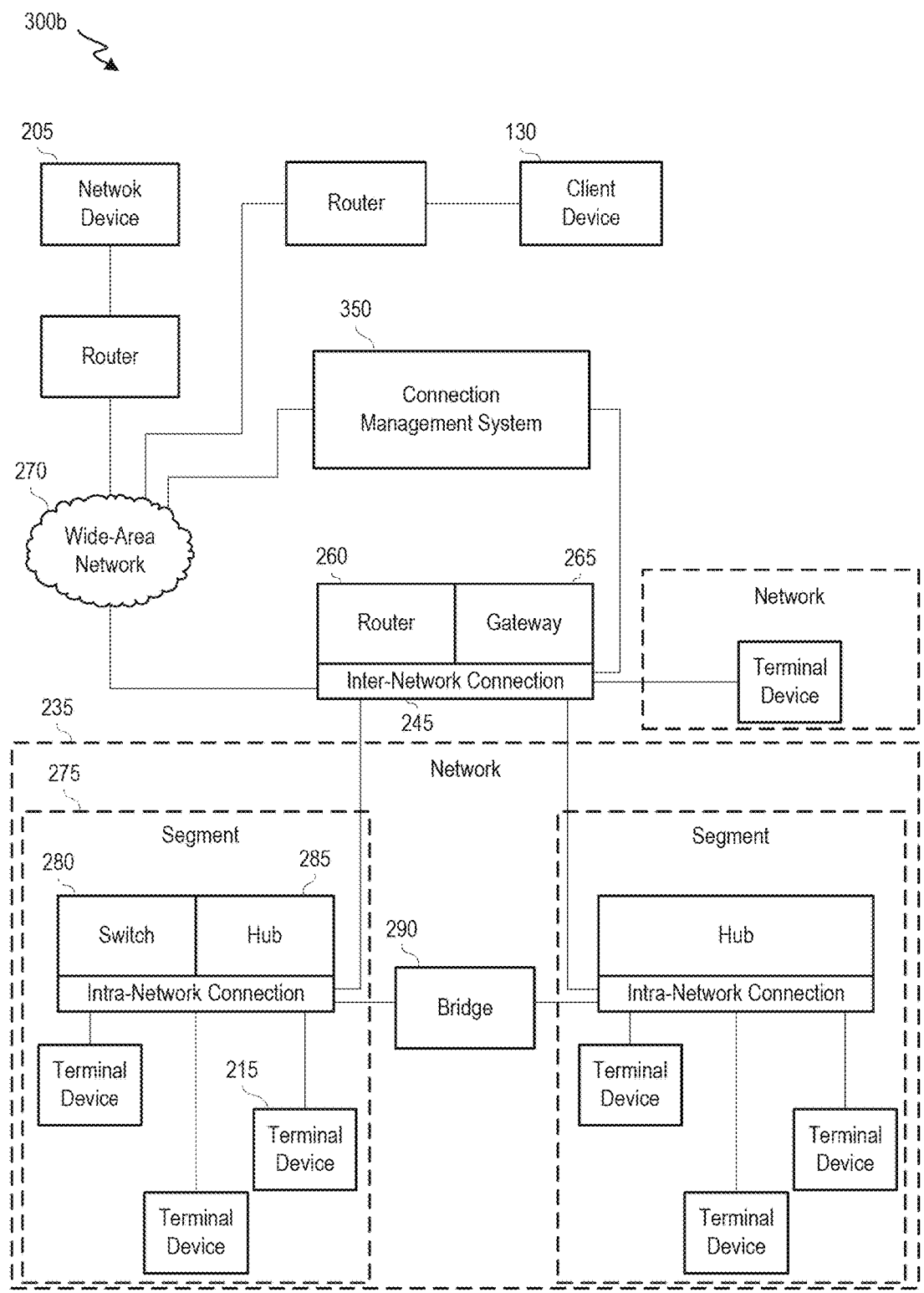
Figure 3C:
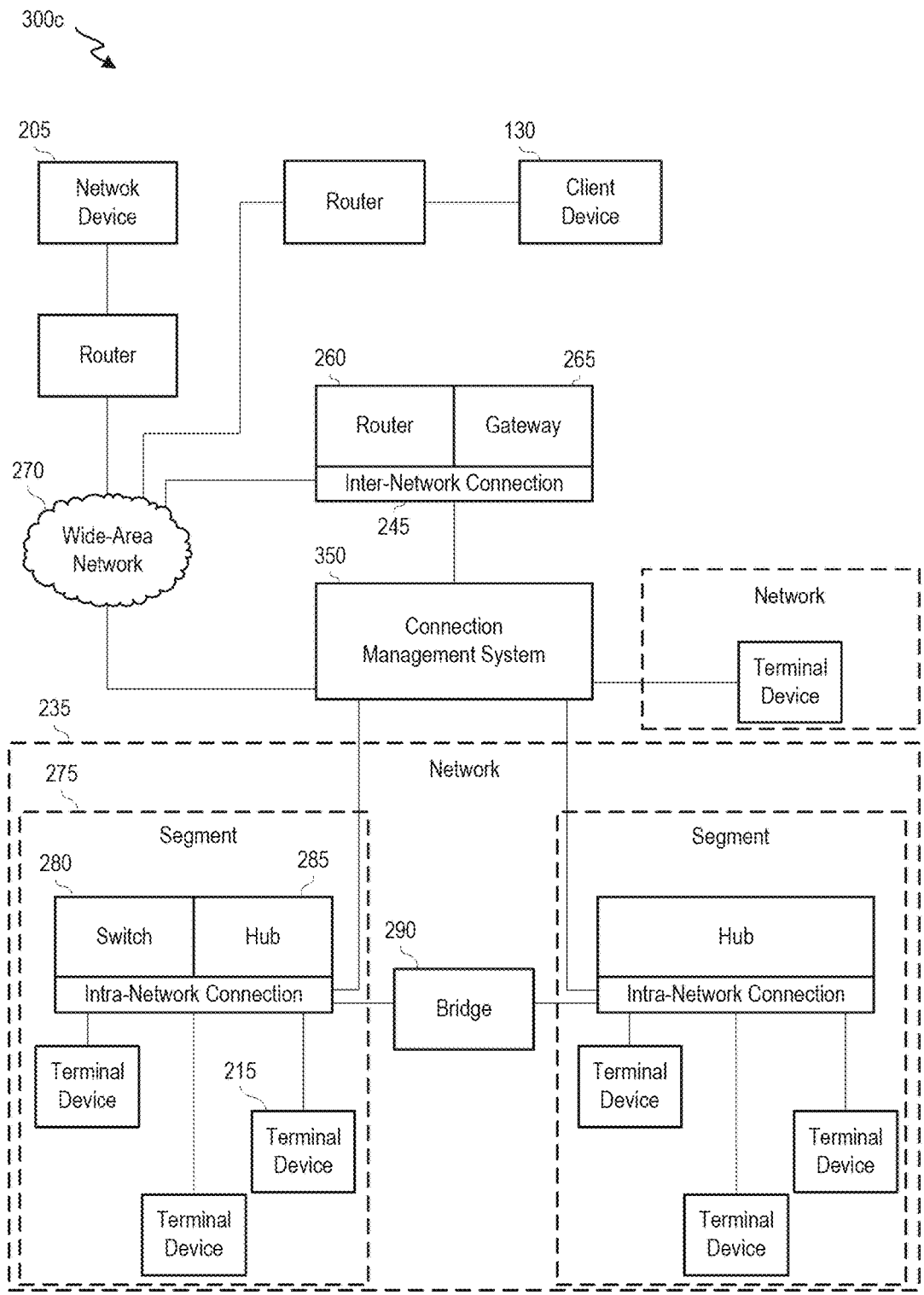

FIGS. 3A-3C show block diagrams of other embodiments of a network interaction system 300a-c that includes a connection management system. Each of the depicted systems 300a-c show only two local-area networks 235 for simplicity, though it can be appreciated that embodiments can be extended to expand the number of local-area networks. Each of systems 300a-c include a connection management system 350, which can identify which terminal device is to communicate with network device 205, can establish and manage (e.g., maintain or close) connection channels, can determine whether and when to re-route communications in an interchange, and so on. Thus, connection management system 350 can be configured to dynamically, and in real-time, evaluate communications, agent availability, capabilities of terminal devices or agents, and so on, to influence routing determinations.

In FIG. 3A, connection management system 350 is associated with each of network device 205 and a remote server 340 (e.g., connection management system 350*a* is associated with network device 205 and connection management system 350*b* is associated with remote server 340). For example, connection management system 350*a* and/or connection management system 350*b* can be installed or stored as an application on each of network device 205 and remote server 340, respectively. Execution of the application(s) can facilitate, for example, a communication between network device 205 and remote server 340 to identify a terminal device 215 selected to participate in a communication with network device 205. The identification can be made based on one or more factors disclosed herein (e.g., availability, comparison between a communication's topic/level of detail with agents' or terminal devices' bases of information, calculated expected latency, channel-type availability, and so on).

A client device 330 can provide client data indicating how routing determinations are to be made. For example, such data can include: indications as to how particular characteristics are to be weighted, compared, or restricted (e.g., relating to load balancing or indicated response latency). Client data can also include specifications related to when communication channels are to be established (or closed) or when communications are to be re-routed to a different network device. Client data can be used to define various client-specific rules, such as rules for communication routing and so on.

Connection management system 350*b* executing on remote server 340 can monitor various metrics relating to terminal devices (e.g., relating to a given client), such as which communication channels are supported, geographic and/or network proximity to a network device, communication latency and/or stability with the terminal device, a type of the terminal device, a capability of the terminal device, whether the terminal device (or agent) has communicated with a given network device (or user) before and/or characteristics of associated agents. Accordingly, communication management system 350*b* may be enabled to select routings to facilitate faster responses that more accurately and/or completely respond to a network-device communication based on the metrics.

In the example depicted in FIG. 3A, communications between network device 205 and remote server 340 can facilitate early identification of a destination address. Network device 205 may then use the destination address to direct subsequent communications. For example, network device 205 may send an initial communication to remote server 340 (e.g., via one or more inter-network connections and a wide-area network), and remote server 340 may identify one or more corresponding clients. Remote server 340 may then identify a set of terminal devices associated with the one or more corresponding clients and obtain metrics for those terminal devices. The metrics can be evaluated (e.g., by remote server 340) so as to select a terminal device to involve in communication, and information relating to the terminal device (e.g., an IP address) can be sent to network device 205. In some embodiments, remote server 340 may continuously or periodically obtain and evaluate metrics for various terminal devices and store evaluation results in a data store. In such embodiments, upon identifying a set of terminal devices associated with the one or more corresponding clients, remote server 340 can access the stored evaluation results from the data store and select a terminal device to involve in the communication interchange based on the stored evaluation results.

In FIG. 3B, connection management system 350 can be configured to serve as a relay and/or destination address. Thus, for example, a set of network devices 205 may transmit communications, each identifying connection management system 350 as a destination. Connection management system 350 can receive each communication and can simultaneously monitor a set of terminal devices (e.g., so as to generate metrics for each terminal device). Based on the monitoring and a rule, connection management system 350 can identify a terminal device 215 to which it may relay each communication. Depending on the embodiment, terminal device communications may similarly be directed to a consistent destination (e.g., of connection management system 350) for further relaying, or terminal devices may begin communicating directly with corresponding network devices. These embodiments can facilitate efficient routing and thorough communication monitoring.

The embodiment depicted in FIG. 3C is similar to that in FIG. 3B. However, in some embodiments, connection management system 350 is directly connected to intra-network components (e.g., terminal devices, intra-network connections, or other).

It will be appreciated that many variations of FIGS. 3A-3C are contemplated. For example, connection management system 350 may be associated with a connection component (e.g., inter-network connection component 245 or intra-network connection component 255) such that an application corresponding to connection management system 350 (or part thereof) is installed on the component. The application may, for example, perform independently or by communicating with one or more similar or associated applications (e.g., executing on one or more other components, network devices or remotes servers).

Figure 4:
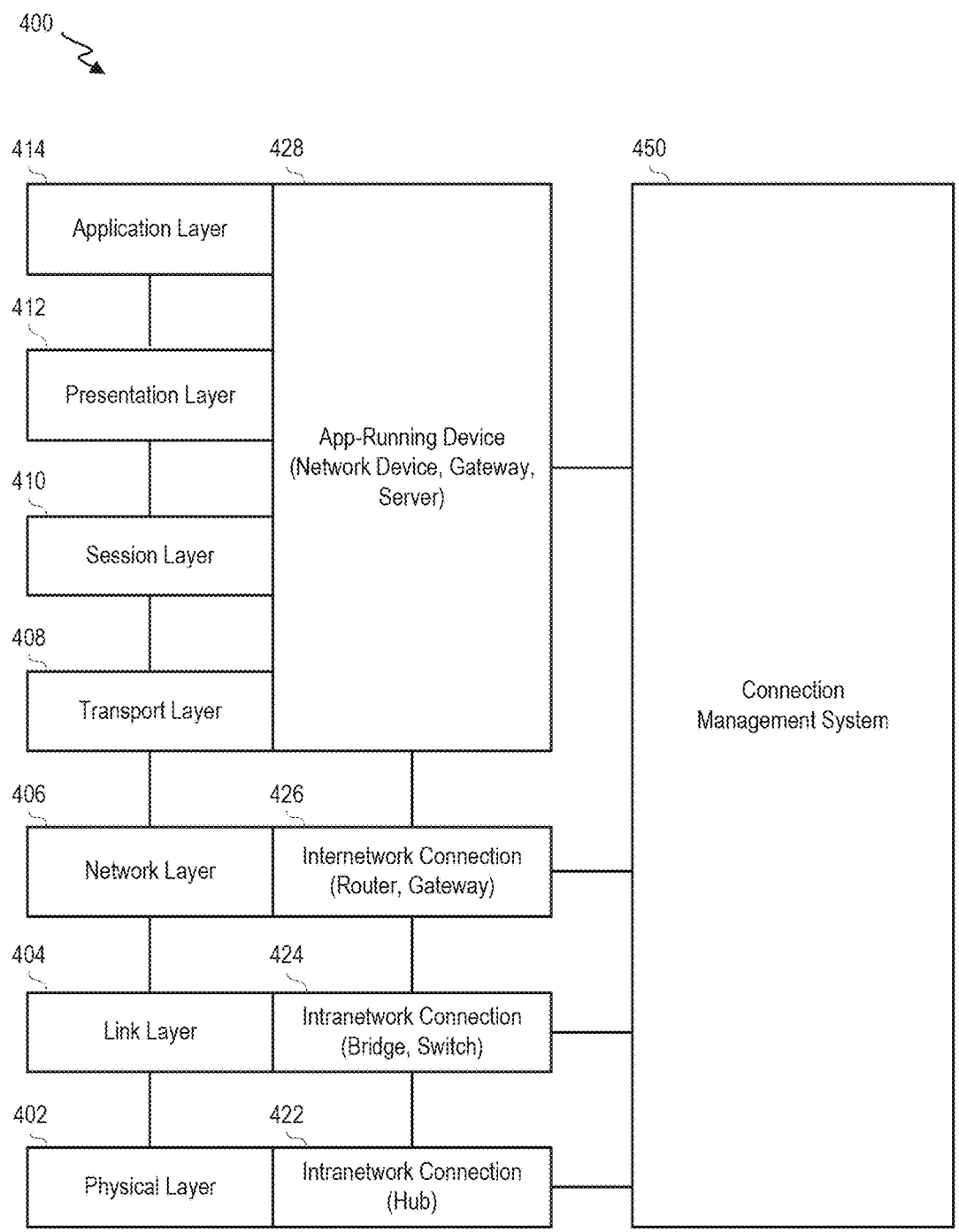
FIG. 4 shows a representation of a protocol-stack mapping of connection components' operation.

FIG. 4 shows a representation of a protocol-stack mapping 400 of connection components' operation. More specifically, FIG. 4 identifies a layer of operation in an Open Systems Interaction (OSI) model that corresponds to various connection components.

The OSI model can include multiple logical layers 402-414. The layers are arranged in an ordered stack, such that layers 402-412 each serve a higher level and layers 404-414 is each served by a lower layer. The OSI model includes a physical layer 402. Physical layer 402 can define parameters physical communication (e.g., electrical, optical, or electromagnetic). Physical layer 402 also defines connection management protocols, such as protocols to establish and close connections. Physical layer 402 can further define a flow-control protocol and a transmission mode.

A link layer 404 can manage node-to-node communications. Link layer 404 can detect and correct errors (e.g., transmission errors in the physical layer 402) and manage access permissions. Link layer 404 can include a media access control (MAC) layer and logical link control (LLC) layer.

A network layer 406 can coordinate transferring data (e.g., of variable length) across nodes in a same network (e.g., as datagrams). Network layer 406 can transform a logical network address to a physical machine address.

A transport layer 408 can manage transmission and receipt quality. Transport layer 408 can provide a protocol for transferring data, such as a Transmission Control Protocol (TCP). Transport layer 408 can perform segmentation/desegmentation of data packets for transmission and can detect and track transmission errors occurring in layers 402-406. A session layer 410 can initiate, maintain and terminate connections between local and remote applications. Sessions may be used as part of remote-procedure interactions. A presentation layer 412 can encrypt, decrypt and format data based on data types known to be acknowledged by an application or network layer.

An application layer 414 can communicate with software applications that control or manage communications. Via such applications, application layer 414 can (for example) identify destinations, local resource states or availability and/or communication content or formatting. Various layers 402-414 can perform other functions as available and applicable.

Intra-network connection components 422, 424 are shown to operate in physical layer 402 and link layer 404. More specifically, a hub can operate in the physical layer, such that operations can be controlled with respect to receipts and transmissions of communications. Because hubs lack the ability to address communications or filter data, they possess little to no capability to operate in higher levels. Switches, meanwhile, can operate in link layer 404, as they are capable of filtering communication frames based on addresses (e.g., MAC addresses).

Meanwhile, inter-network connection components 426, 428 are shown to operate on higher levels (e.g., layers 406-414). For example, routers can filter communication data packets based on addresses (e.g., IP addresses). Routers can forward packets to particular ports based on the address, so as to direct the packets to an appropriate network. Gateways can operate at the network layer and above, perform similar filtering and directing and further translation of data (e.g., across protocols or architectures).

A connection management system 450 can communicate with and/or operate on, in various embodiments, one, more, all or any of the various layers. For example, connection management system 450 can communicate with a hub so as to dynamically adjust which terminal devices the hub communicates. As another example, connection management system 450 can communicate with a bridge, switch, router or gateway so as to influence which terminal device the component selects as a destination (e.g., MAC, logical or physical) address. By way of further examples, a connection management system 450 can monitor, control, or direct segmentation of data packets on transport layer 408, session time range on session layer 410, and/or encryption and/or compression on presentation layer 412. In some embodiments, connection management system 450 can communicate with various layers by communicating with (e.g., sending commands to) equipment operating on a particular layer (e.g., a switch operating on link layer 404), by routing or modifying existing communications (e.g., between a network device and a terminal device) in a particular manner, and/or by generating new communications containing particular information (e.g., new destination addresses) based on the existing communication. Thus, connection management system 450 can influence communication routing and channel establishment (or maintenance or termination) via interaction with a variety of devices and/or via influencing operating at a variety of protocol-stack layers.

Figure 5:
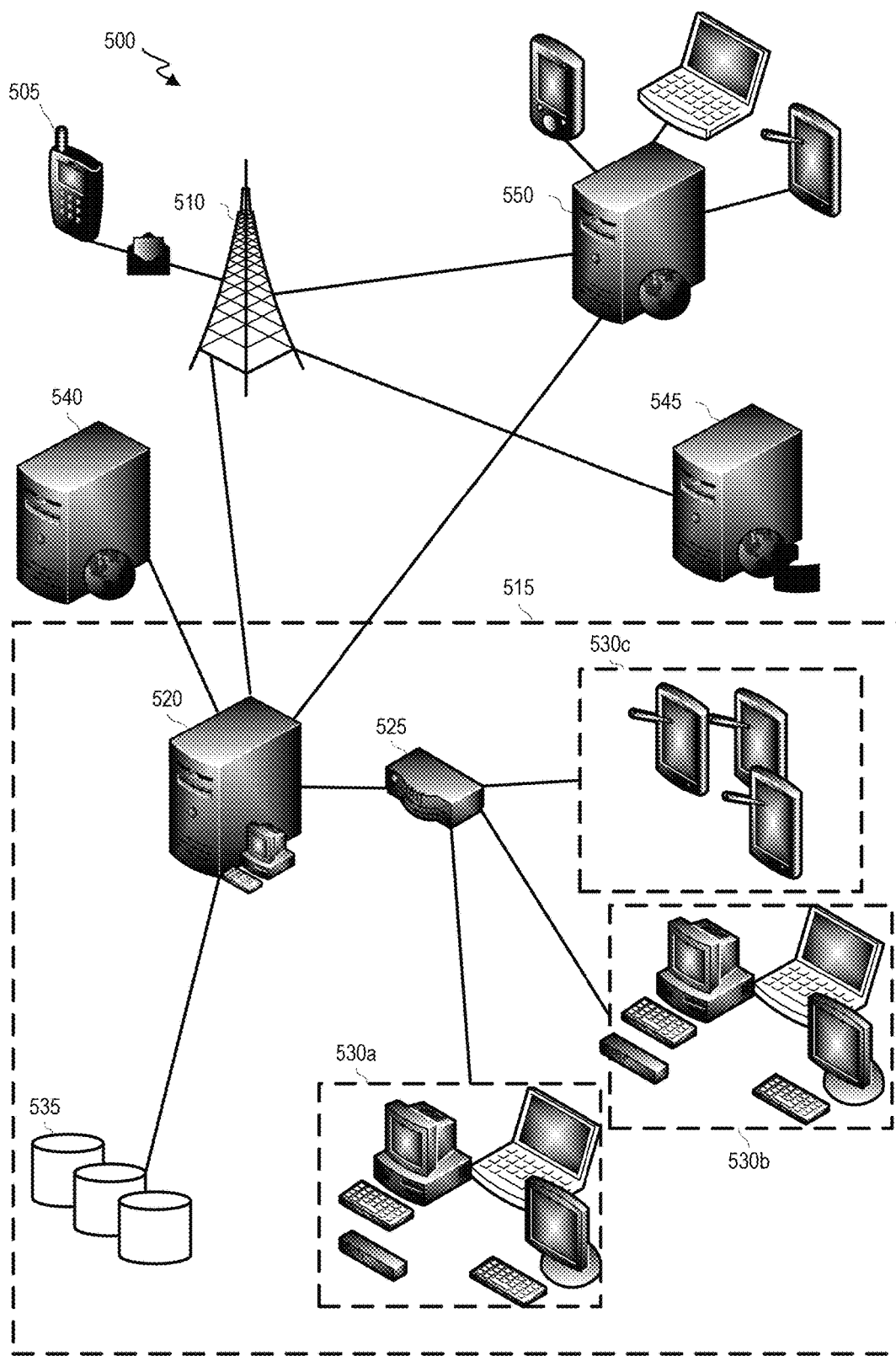
FIG. 5 represents a multi-device communication interaction system according to an embodiment.

FIG. 5 represents a multi-device communication interaction system 500 according to an embodiment. System 500 includes a network device 505 configured to communicate with a variety of types of terminal devices over a variety of types of communication channels.

In the depicted instance, network device 505 can transmit a communication over a cellular network (e.g., via a base station 510). The communication can be routed to an operative network 515. Operative network 515 can include a connection management system 520 that receives the communication and identifies which terminal device is to respond to the communication. Such determination can depend on identifying a client to which that communication relates (e.g., based on a content analysis or user input indicative of the client) and determining one or more metrics for each of one or more terminal devices associated with the client. For example, in FIG. 5, each cluster of terminal devices 530a-c can correspond to a different client. The terminal devices may be geographically co-located or dispersed. The metrics may be determined based on stored or learned data and/or real-time monitoring (e.g., based on availability).

Connection management system 520 can communicate with various terminal devices via one or more routers 525 or other inter-network or intra-network connection components. Connection management system 520 may obtain, analyze and/or store data from or relating to communications, terminal-device operations, client rules, and/or user-associated actions (e.g., online activity, profile data, interaction data, etc.) at one or more data stores. Such data may influence communication routing.

Notably, various other devices can further be used to influence communication routing and/or processing. For example, in the depicted instance, connection management system 520 also is connected to a web server 545. Thus, connection management system 540 can retrieve data related to a topic, such as technical item specifications, and so on.

Network device 505 may also be connected to a web server (e.g., including a streaming web server 545). In some instances, communication with such a server provided an initial option to initiate communication with connection management system 520. For example, network device 505 may detect that, while visiting a particular URL or web page, a communication opportunity is available and such an option can be presented.

One or more elements of communication system 500 can also be connected to a social-networking server 550. Social networking server 550 can aggregate data received from a variety of user devices. Thus, for example, connection management system 520 may be able to determine a general (or user-specific) message characteristic towards a given topic or determine one or more general actions of a given user or class of users.

Figure 6:
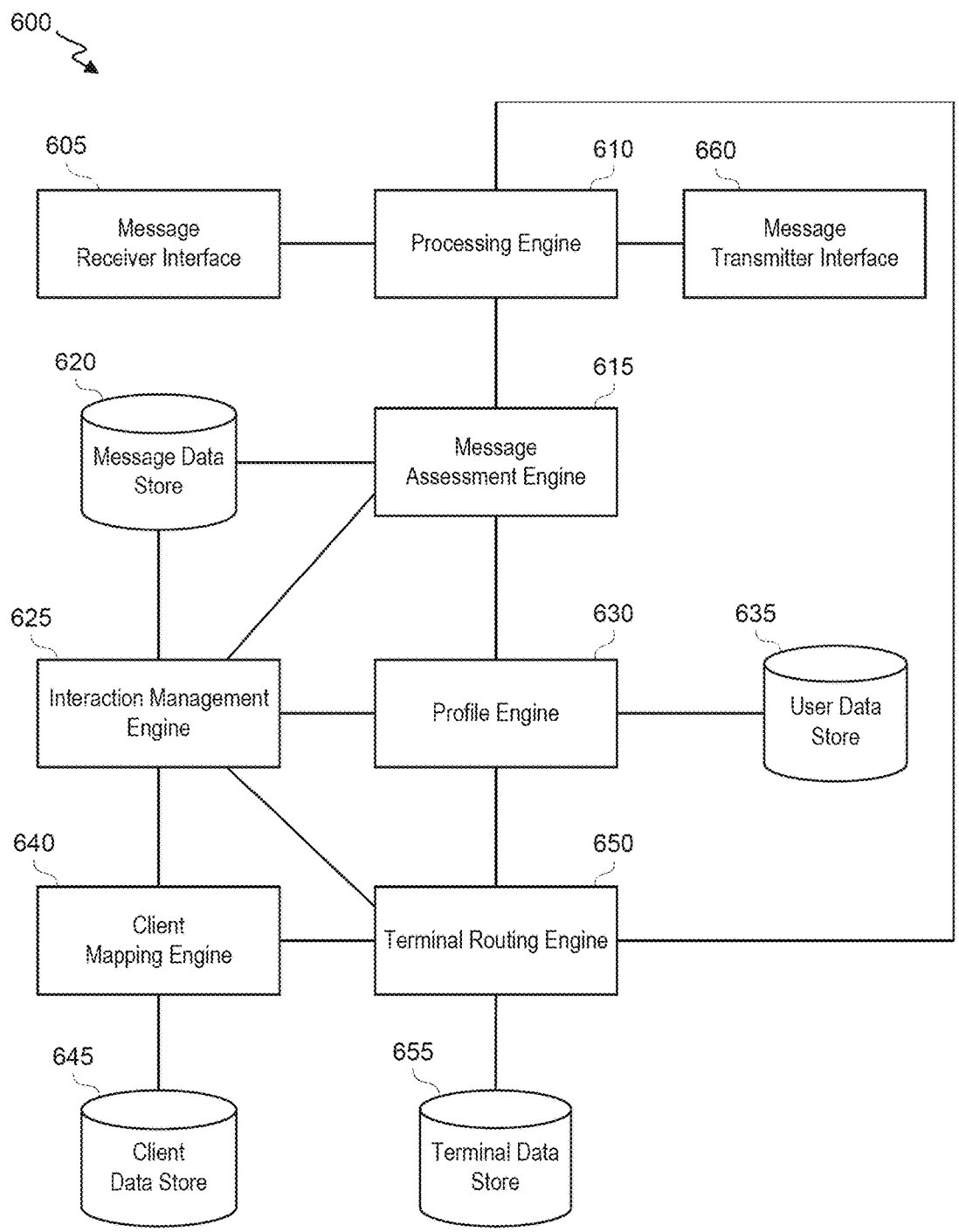
FIG. 6 shows a block diagram of an embodiment of a connection management system.

FIG. 6 shows a block diagram of an embodiment of a connection management system 600. A message receiver interface 605 can receive a message. In some instances, the message can be received, for example, as part of a communication transmitted by a source device (e.g., housed separately from connection management system 600 or within a same housing), such as a network device or terminal device. In some instances, the communication can be part of a series of communications or a communicate interchange, which can include a series of messages being routed between two devices (e.g., a network device and terminal device). This message or communication interchange may be part of and/or may define an interaction between the devices. A communication channel or operative channel can include one or more protocols (e.g., routing protocols, task-assigning protocols and/or addressing protocols) used to facilitate routing and communication between the devices.

In some instances, the message can include a message generated based on inputs received at a local or remote user interface. For example, the message can include a message that was generated based on button or key presses or recorded speech signals. In one instance, the message includes an automatically generated message, such as one generated upon detecting that a network device is presenting a particular application (or app) page or URL or has provided a particular input command (e.g., key sequence). The message can include an instruction or request, such as one to initiate communication.

In some instances, the message can include or be associated with an identifier of a client. For example, the message can explicitly identify the client (or a device associated with the client); the message can include or be associated with a URL or application page (e.g., a mobile application or app) associated with the client; the message can include or be associated with a destination address associated with a client; or the message can include or be associated with an identification of an item or requested performance associated with the client (e.g., being offered by the client, having been obtained by the client or being one that the client services). To illustrate, a network device may be presenting an application page of a particular client, which may provide an option to transmit a communication to an agent. Upon receiving user input corresponding to a message, a communication may be generated to include the message and an identifier of the particular client. The message can be routed to a particular terminal device or particular set of terminal devices (e.g., terminal devices used by agents or provider proxies).

A processing engine 610 may process a received communication and/or message. Processing can include, for example, extracting one or more particular data elements (e.g., a message, a client identifier, a network-device identifier, a profile identifier, and so on). Processing can include transforming a formatting or communication type (e.g., to be compatible with a particular device type, operating system, communication-channel type, protocol and/or network).

A message assessment engine 615 may evaluate the (e.g., extracted or received) message. The evaluation can include identifying, for example, one or more categories or tags for the message. Examples of category or tag types can include (for example) topic, message characteristic, complexity and urgency. A difference between categorizing and tagging a message can be that categories can be limited (e.g., according to a set of category options), while tags can be open. A topic can include, for example, an object or information associated with the object, a requested performance, a technical inquiry, or a communication request. A category or tag can be determined, for example, based on a semantic analysis of a message (e.g., by identifying keywords, sentence structures, repeated words, punctuation characters and/or non-article words); user input (e.g., having selected one or more categories); and/or message-associated parameters (e.g., typing speed and/or response latency).

In some instances, message assessment engine 615 can determine a metric for a message. A metric can include, for example, a number of characters, words, capital letters, all-capital words or instances of particular characters or punctuation marks (e.g., exclamation points, question marks and/or periods). A metric can include a ratio, such as a fraction of sentences that end with an exclamation point (or question mark), a fraction of words that are all capitalized, and so on.

Message assessment engine 615 can store a message, message metric and/or message parameter in a message data store 620. Each message can also be stored in association with other data (e.g., metadata), such as data identifying a corresponding source device, destination device, network device, terminal device, client, one or more categories, one or more stages and/or message-associated parameters). Various components of connection management system 600 (e.g., message assessment engine 615 and/or an interaction management engine 625) can inquiry message data store 620 to retrieve inquiry-responsive messages, message metrics and/or message parameters.

An interaction management engine 625 can determine to which device a communication is to be routed and how the receiving and transmitting devices are to communicate. Each of these determinations can depend, for example, on whether a particular network device (or any network device associated with a particular user) has previously communicated with a terminal device in a set of terminal devices (e.g., any terminal device associated with connection management system 600 or any terminal device associated with one or more particular clients).

In some instances, when a network device (or other network device associated with a same user or profile) has previously communicated with a given terminal device (e.g., about matters relating to a client), communication routing can generally have a selection weighting towards the same terminal device. Other factors that may influence routing can include, for example, an inferred or identified user or agent message characteristic relating to the previous communication; a topic of a present communication (e.g., and an extent to which that relates to a topic of a previous communication and/or a base of information associated with one or more terminal devices or agents); whether the terminal device (or corresponding agent) is available; and/or an indicated response latency of the terminal device. Such factors may be considered absolutely or relative to similar metrics corresponding to other terminal devices. A re-routing rule (e.g., a client-specific or general rule) can indicate how such factors are to be assessed and weighted to determine whether to forego agent consistency.

When a network device (or other network device associated with a same user or profile) has not previously communicated with a given terminal device (e.g., about matters relating to a client), a terminal-device selection can be performed based on factors such as, for example, an extent to which various agents' base of information corresponds to a communication topic, availability of various agents at a given time and/or over a channel type, types and/or capabilities of terminal devices (e.g., associated with the client), a language similarity between a user and agents, and/or a characteristic analyses. In one instance, a rule can identify how to determine a sub-value to assign to one or more factors such as these and a weight to assign to each value. By combining (e.g., summing) weighted sub-values, a value for each agent can be determined. A terminal device selection can then be made by comparing terminal devices' values (e.g., to select a high or highest value).

With regard to determining how devices are to communicate, interaction management engine 625 can (for example) determine whether a terminal device is to respond to a communication via (for example) email, online chat, SMS message, voice call, video chat, etc. A communication type can be selected based on, for example, a communication-type priority list (e.g., at least partly set by a client or user); a type of a communication previously received from the network device (e.g., so as to improve consistency), a complexity of a received message, capabilities of the network device, and/or an availability of one or more terminal devices. Appreciably, some communication types will result in real-time communication (e.g., where fast message response is expected), while others can result in asynchronous communication (e.g., where delays (e.g., of several minutes or hours) between messages are acceptable).

Further, interaction management engine 625 can determine whether a continuous channel between two devices should be established, used or terminated. A continuous channel can be structured so as to facilitate routing of future communications from a network device to a specified terminal device. This continuous channel can persist even across message series (e.g., days, weeks or months). In some instances, a representation of a continuous channel (e.g., identifying an agent) can be included in a presentation to be presented on a network device. In this manner, a user can understand that communications are to be consistently routed so as to improve efficiency.

In one instance, a value can be generated using one or more factors described herein and a rule (e.g., that includes a weight for each of the one or more factors) to determine a connection value corresponding to a given network device and terminal device. The value may relate to an overall similarity or one specific to a given communication or communication series. Thus, for example, the value may reflect a degree to which a given terminal device is determined to be suited to respond to a network-device communication. In some instances, a value analysis can be used to identify each of a terminal device to route a given communication to and whether to establish, use or terminate a connection channel. When a value analysis is used to both address a routing decision and a channel decision, a value relevant to each decision may be determined in a same, similar or different manner.

Thus, for example, it will be appreciated that different factors may be evaluated depending on whether the value is to determine a strength of a comparison versus one to respond to a particular message inquiry. For example, in the former instance, factors of overall time allocations and time zones may be important, while in the latter instance, immediate availability may be more highly weighted. A value can be determined for a single network-device/terminal-device combination, or multiple value can be determined, each characterizing a comparison between a given network device and a different terminal device.

To illustrate, a set of three terminal devices associated with a client may be evaluated for possible communication routing. A value may be generated for each terminal device that relates to a comparison for the particular communication. Each of the first two terminal devices may have previously communicated with a network device having transmitted the communication. An input from the network device may have indicated satisfaction with an interaction with the communication(s) with the first device. Thus, a past-interact sub-value (as calculated according to a rule) for the first, second and third devices may be 10, 5, and 0, respectively. (Negative satisfaction inputs may result in negative sub-values.) It may be determined that only the third terminal device is immediately available. It may be determined that the second terminal device will be available for responding within 15 minutes, but that the first terminal device will not be available for responding until the next day. Thus, a fast-response sub-value for the first, second and third devices may be 1, 3 and 10. Finally, it may be determined a degree to which an agent (associated with the terminal device) has access to information about a topic in the communication. It may be determined that an agent associated with the third terminal device is more knowledgeable than those associated with the other two devices, resulting in sub-values of 3, 4 and 9. In this example, the rule does not include weighting or normalization parameters (though, in other instances, a rule may), resulting in values of 14, 11 and 19. Thus, the rule may indicate that the message is to be routed to a device with the highest value, that being the third terminal device. If routing to a particular terminal device is unsuccessful, the message can be routed to a device with the next-highest value, and so on.

A value may be compared to one or more absolute or relative thresholds. For example, values for a set of terminal devices can be compared to each other to identify a high value to select a terminal device to which a communication can be routed. As another example, a value (e.g., a high value) can be compared to one or more absolute thresholds to determine whether to establish a continuous channel with a terminal device. An overall threshold for establishing a continuous channel may (but need not) be higher than a threshold for consistently routing communications in a given series of messages. This difference between the overall threshold and the threshold for determining whether to consistently route communication may be because a comparison indicates continuity is important in the continuous-channel context given the extended utility of the channel. In some embodiments, an overall threshold for using a continuous channel may (but need not) be lower than a threshold for establishing a continuous channel and/or for consistently routing communications in a given series of messages.

Interaction management engine 625 can communicate with a profile engine 630 in various contexts. For example, profile engine 630 may look up an identifier of a network device or terminal device in a user data store 635 to identify a profile corresponding to the device. Further, profile engine 630 can maintain data about previous communications (e.g., times, involved other device(s), channel type, resolution stage, topic(s) and/or associated client identifier), connection channels (e.g., indicating—for each of one or more clients—whether any channels exist, a terminal device associated with each channel, an establishment time, a usage frequency, a date of last use, any channel constraints and/or supported types of communication), user- or agent-set data (e.g., preferences) or constraints (e.g., related to terminal-device selection, response latency, terminal-device consistency, agent expertise, and/or communication-type constraints), and/or user or agent characteristics (e.g., age, language(s) spoken or preferred, geographical location, interests, and so on).

Further, interaction management engine 625 can transmit a notification message to profile engine 630 including various connection-channel actions, such that user data store 635 can be updated with the channel data. For example, upon establishing a channel, interaction management engine 625 can notify profile engine 630 of the establishment and identify one or more of: a network device, a terminal device, a profile and a client. Profile engine 630 can (in some instances) subsequently notify a user of the channel's existence such that the user can be aware of the agent consistency being availed.

Interaction management engine 625 can further communicate with a client mapping engine 640, which can map a communication to one or more clients (and/or associated brands). In some instances, a communication received from a network device itself includes an identifier corresponding to a client (e.g., an identifier of a client, item, requested performance, URL, or app page). The identifier can be included as part of a message (e.g., which client mapping engine 640 may detect) or included as other data in a message-inclusive communication. Client mapping engine 640 may then look up the identifier in a client data store 645 to retrieve additional data about the client and/or an identifier of the client.

In some instances, a message may not particularly correspond to any client. For example, a message may include a general inquiry. Client mapping engine 640 may, for example, perform a semantic analysis on the message, identify one or more keywords and identify one or more clients associated with the keyword(s). In some instances, a single client is identified. In some instances, multiple clients are identified. An identification of each client may then be presented via a network device such that a user can select a client to communicate with (e.g., via an associated terminal device).

Client data store 645 can include identifications of one or more terminal devices (and/or agents) associated with the client. A terminal routing engine 650 can retrieve or obtain data relating to each of one, more or all such terminal devices (and/or agents) so as to influence routing determinations. For example, terminal routing engine 650 may maintain a terminal data store 655, which can store information such as terminal devices' device types, operating system, communication-type capabilities, installed applications accessories, geographic location and/or identifiers (e.g., IP addresses). Information can also include agent information, such as experience level, position, proficiency level, bases of information (e.g., topics that the agent is familiar with and/or a level of information-access for various topics), characteristic metrics, availability time range, language(s) spoken and/or demographic information. Some information can be dynamically updated. For example, information indicating whether a terminal device is available may be dynamically updated based on (for example) a communication from a terminal device (e.g., identifying whether the device is asleep, being turned off/on, idle/active, or identifying whether input has been received within a time range); a communication routing (e.g., indicative of whether a terminal device is involved in or being assigned to be part of a communication interchange); or a communication from a network device or terminal device indicating that communication has ended or begun.

It will be appreciated that, in various contexts, being engaged in one or more communication interchanges (or communications sessions) does not necessarily indicate that a terminal device is not available to engage in another communication interchange. Various factors, such as communication types (e.g., message, email, chat, phone), client-identified or user-identified target response times, and/or system loads (e.g., generally or with respect to a user) may influence how many communication sessions a terminal device may be involved in.

When interaction management engine 625 has identified a terminal device to involve in a communication or a connection channel, it can notify terminal routing engine 650, which may retrieve any pertinent data about the terminal device from terminal data store 655, such as a destination (e.g., IP) address, device type, protocol, etc. Processing engine 610 can then (in some instances) modify the message-inclusive communication or generate a new communication (including the message) so as to have a particular format, comply with a particular protocol, and so on. In some instances, a new or modified message may include additional data, such as profile data corresponding to a network device, a message chronicle, and/or client data.

A message transmitter interface 660 can then transmit the communication to the terminal device. The transmission may include, for example, a wired or wireless transmission to a device housed in a separate housing. The terminal device can include a terminal device in a same or different network (e.g., local-area network) as connection management system 600. Accordingly, transmitting the communication to the terminal device can include transmitting the communication to an inter- or intra-network connection component.

Providers of items and requested performances can use any of the systems described above with regard to FIG. 1-FIG. 6. For example, users can access (using a device or mobile application platform) published items and requested performances from providers over the Internet, and can communicate with agents (or provider proxies) using the systems described above. Users can find and learn about topics and information from sources in geographically-diverse areas. Further, users are able to locate sources for items or requested performances. Various messages are communicated using the Internet, transmitting large amounts of data and information.

Figure 7:
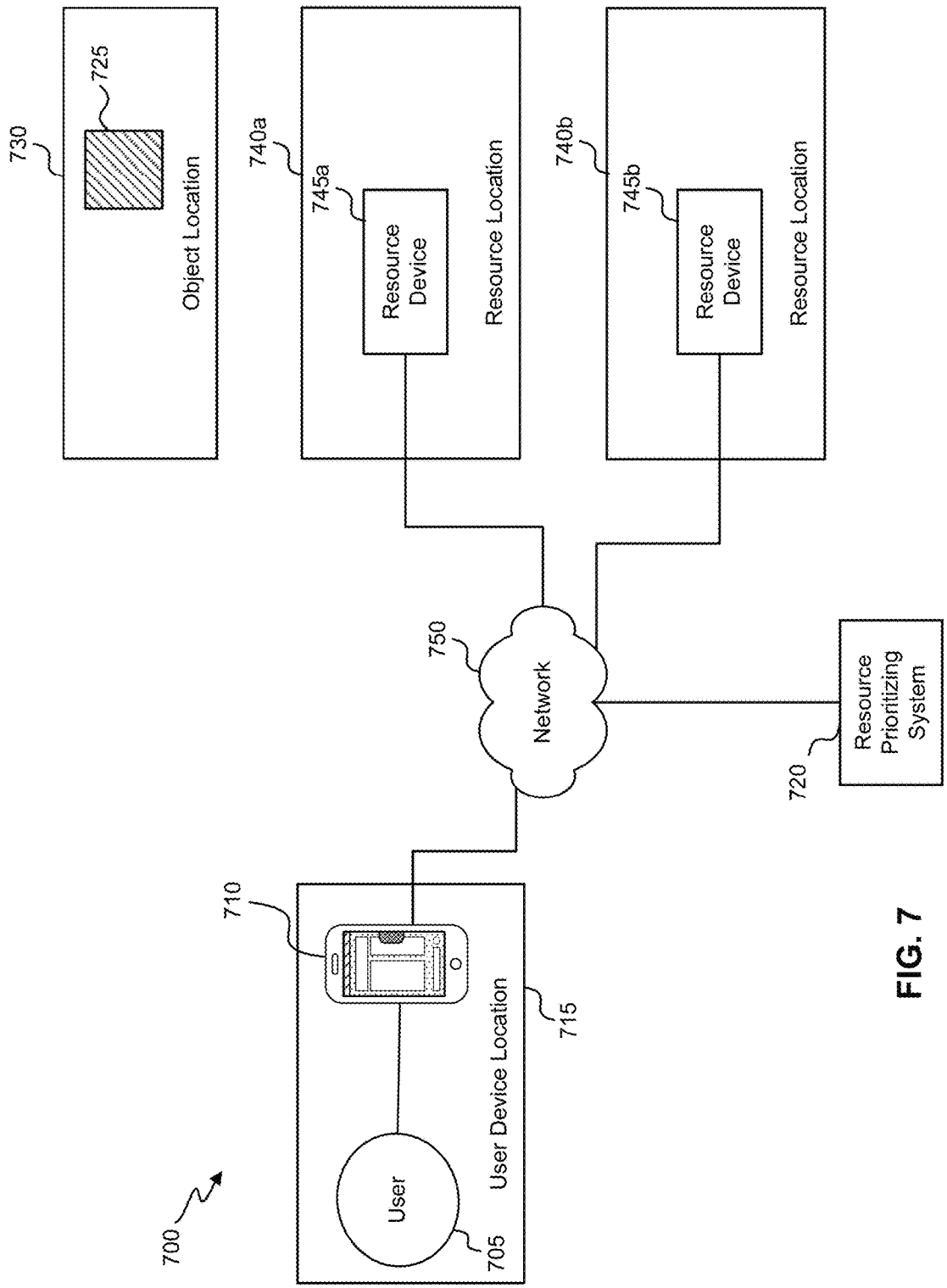
FIG. 7 a block diagram of an interaction environment according to an embodiment of the invention.

FIG. 7 is a block diagram of an interaction environment 700 according to an embodiment of the invention. For example, interaction environment 700 can be another embodiment of network interaction system 100. A user 705 operate a user device 710 while the device is at a user device location 715. The interaction can include, for example, entering text, clicking on a virtual or non-virtual button on the device (e.g., a communication-request option on a URL), and/or providing input that triggers a camera or sensor on the device to detect a proximate object code (e.g., barcode or QR code).

In response to an interaction, user device 710 can generate and transmit a request communication to a resource prioritization system 720. The request communication can include data indicative of user device location (e.g., geographic coordinates, an indication as to whether user device location is in any particular building or geographical location, or an address), content including a request subject (e.g., identifying a topic or query), a client (e.g., an entity associated with the building or geographical location) and/or identifying an object (e.g., corresponding to a scanned code or a URL presented when the interaction was detected), and/or one or more constraints (e.g., with regard to a type of communication channel). In some instances, at least some of the request communication data is generated based on a URL (or portion thereof) or app page that is being presented on user device 710 while a request-initiating action is detected (e.g., to identify an object or client corresponding to the page).

Resource prioritizing system 720 can analyze the request communication to identify an object 725 associated with the request. Identifying object 725 can include identifying one or more object properties and/or object types. For example, if a request communication corresponds to a Model ABC Smartphone, identifying the object can include identifying Model ABC Smartphone rather than identifying a particular smartphone that is a Model ABC Smartphone. In some instances, identifying object 725 can include identifying a specific object (e.g., via identifying a particular object code).

Resource prioritizing system 720 can identify one or more object locations 730 associated with object 725. For example, objects can be associated with object locations in a data store based on data received from communicating tags on the objects identifying the objects' locations, data received from scanners detecting objects (e.g., via barcode scans or transmission) and identifying the detected objects and scanners' locations, data received from entities' devices based on client that reports the objects' presence at particular locations and/or data identifying distribution schedules indicating to where and when objects will be distributed. In some instances, a given object 725 can be associated with multiple object locations 730. Resource prioritizing system 720 can then, in some instances, identify a subset of the object locations as those being near to user device location 715 (e.g., any object locations within 5 miles from user device location 715, a top one or five nearest object locations, etc.).

Resource prioritizing system 720 can evaluate the request communication to determine whether to attempt to identify a resource proximate to object 725 (e.g., a resource at a resource location within a distance from object location 730 or in a same geographic area (e.g., that of a building) as the object location is in). The determination can be made based on, for example, an anticipated request-response task time range, an obtainment parameter associated with the object, a request load, an availability of one or more resources (e.g., in general or near the object location), and/or a specification and/or base of information of available resources (e.g., at a location near the object and/or at another location).

Resource prioritizing system 720 can access resource data relating to each of a set of resources. Each resource can correspond, for example, to a resource device 745a, 745b. The resource data can identify a resource location 740a, 740b of a corresponding resource, which may be identified based on tracking or requesting a location of each resource device 745a, 745b. The resource data can further identify, for each of one or more resources, whether (and/or an extent to which) a specification and/or base of information of the resource corresponds to a request's content (e.g., whether a resource is associated with a department in which an object is available), whether the resource is available for processing a request, communication-channel constraints and/or obtainment parameters associated with the resource.

Resource prioritizing system 720 can use the resource data to identify a subset of the set of resources (e.g., one resource) to be assigned to and to respond to the request. In some instances, such assignment can be conditioned upon receiving an acknowledgment communication for a proposed assignment from a resource device.

In some instances, resource prioritizing system 720 can also identify a type of communication channel to establish between a resource device and user device (e.g., a phone, virtual chat, video chat or message channel). The determination can be made, for example, based on a priority of a request, a request load and/or a location of an identified resource device (e.g., relative to a user device or object).

In some instances, resource prioritizing system 720 determines whether a resource is to process a request in person. This determination may be related to, or separate from, any identification of a communication channel type. For example, it may be determined that a phone channel is to be established between a resource and user for each of two requests. Meanwhile, an instruction may be sent to the resource to go to the user location in only one of these instances. The determination as to whether a resource is to process (e.g., handle or respond to) the request in person may be based on, for example, a priority of a request, a request load and/or a location of an identified resource device (e.g., relative to a user device or object).

Resource prioritizing system 720 can then establish a communication channel (e.g., of the identified type) between the identified resource device and user device 710. Establishing the communication channel can include, for example, initiating a phone call, video chat, virtual text chat or message session between the devices. In one instance, resource prioritizing system 720 initially connects with each of user device 710 and the identified resource device and then initiate a direct connection between the devices.

Resource prioritizing system 720 can further obtain post-request data, such as a time spent by a resource communicating with a user (e.g., over an established communication channel and/or in person). In one instance, locations of user device 715 and the identified resource device can be monitored, such that resource prioritizing system 720 can determine a time range that the identified resource spent with user 705 in person. Location data can further be used to track the resource while the resource is moving towards user 705, Such tracking data can be used to inform user 705 as to where the resource is, how to arrive at the resource and/or how long it will likely take for a resource to arrive at user device location 715.

Post-request data may further include request-specific obtainment data, which may indicate whether a particular object or requested performance was obtained, an attribute (e.g., price) of the object, a number of items, and/or a number of objects viewed (e.g., which may be determined based on user device tracking). Request-specific obtainment data can be stored with other request and/or request-handling variables, such as ones identifying object 725, whether a resource processed or handled the request, a type of communication channel established, a time range that a resource devoted to the request, and/or a resource identifier and/or type.

Communications between devices can be transmitted via one or more data paths and over one or more networks 750. A network of one or more networks 750 can include a wired network (e.g., fiber, ethernet, powerline ethernet, ethernet over coaxial cable, digital signal line (DSL), or the like), wireless network (e.g., Zigbee™, Bluetooth™, WiFi™, IR, UWB, WiFi-Direct, BLE, cellular, Long-Term Evolution (LTE), WiMax™, or the like), or a combination of a wired and a wireless network.

User device 710 and/or resource device 745a and/or 745b can include an electronic device capable of transmitting and receiving communications. Exemplary types of user and/or resource devices include a phone, a smartphone, a laptop and/or a computer. User and/or resource devices may have, in some instances, an operating system stored on the device, may have apps stored on the device, may be able to access the Internet and/or may include one or more sensors and/or modules to identify a present location of the device. User and/or resource devices may be able to determine their locations by, for example, receiving and processing GPS signals via a device GPS receiver; detecting and processing wireless signal strengths from one or more WiFi access points; processing recent user input (e.g., identifying a location, such as a zip code (i.e., a location identifier) or building name); and/or detecting signals from client devices that identify a location.

In some instances, locations are repeatedly (e.g., at regular intervals) determined (by a user and/or resource device) and transmitted to resource prioritizing system 720. In some instances, locations are conditionally determined and/or transmitted. For example, transmission of a location from a user device may be conditioned upon whether a request-initiating action was recently (e.g., within a time range) detected, a type of request response to be provided (e.g., foregoing location transmission if a request is not to be responded to with in-person handling of requests) and/or whether a response to a request has been identified as being completed. As another example, transmission of a location from a resource device may be conditioned upon whether the resource is on duty. As discussed further below, real-time (or near real-time) information including device location(s) can be stored and used for prioritization and selection determinations.

Figure 8:
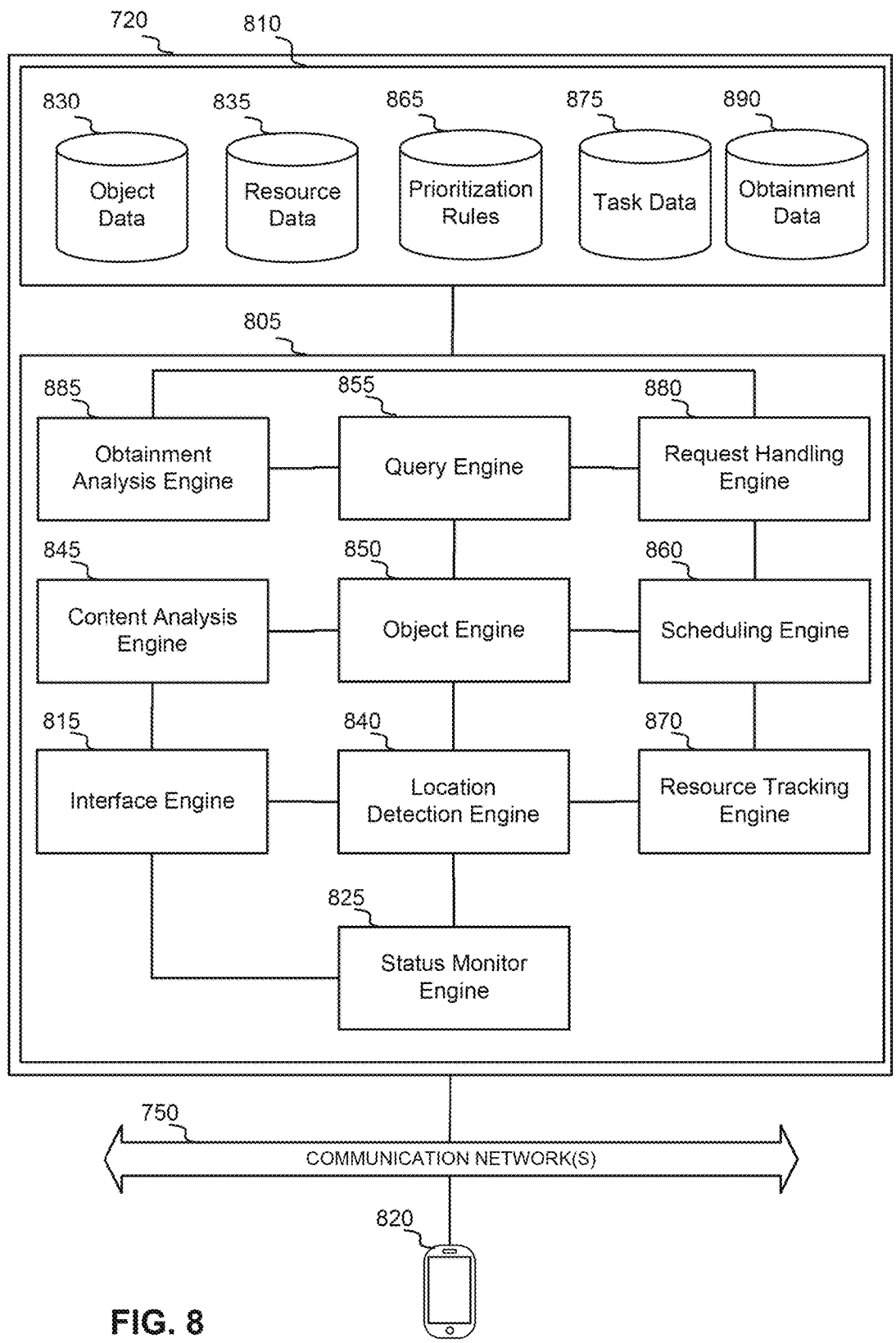
FIG. 8 depicts a block diagram of an embodiment of a resource prioritizing system.

FIG. 8 depicts a block diagram of an embodiment of resource prioritizing system 720. Resource prioritizing system 720 can include one or more devices (e.g., servers). Thus, in some embodiments, resource prioritizing system 720 can be a distributed system (e.g., servers can be located in different geographical locations). In some embodiments, resource prioritization system 720 can be a centralized system (e.g., servers are co-located). In some instances, some or all of resource prioritizing system 720 is in the cloud.

Generally, resource prioritizing system 720 can include an engine subsystem 805, which includes multiple engines. Engine subsystem 805 can include or can use one or more processors in resource prioritizing system 720. It will be appreciated that a single device may include all engines, or multiple devices in resource prioritizing system 720 may include different engines and/or different parts of an engine. For example, one device of resource prioritizing system 720 may include a status monitor engine 825, and another device may not include a status monitor engine but may instead include a query engine 855.

One or more engines in engine subsystem 805 can retrieve data from, store data in, update data in, and/or delete data from a data store in a storage subsystem 810 Storage subsystem 810 can include, for example, an operating system, one or more apps and/or one or more data stores, which may include relational data stores. In some instances, multiple of the depicted data stores can be combined into a single data store. In some instances, a single one of the depicted data stores may include a collection of data stores.

Engine subsystem 805 can include an interface engine 815 configured to receive incoming communications, generate communications and transmit outgoing communications. Communications can be received and/or transmitted via one or more networks 750 from or to a device 820, such as a user device or resource device. Interface engine can operate within one or more layers in a protocol stack, such as an application layer, transport layer, Internet layer and/or link layer. In some instances, interface engine 815 includes multiple sub-engines, and each sub-engine may operate in a different one or more protocol stacks (e.g., such as having a different interface sub-engine operating in each of the above-identified four layers).

While operating in the application layer, interface engine 815 can obtain the appropriate data to be included in a communication, can identify a destination, and/or can initiate a communication transmission. Further, interface engine 815 can extract data from an incoming communication and use the data to, for example, generate or modify a presentation, update a data store (e.g., to include some or all of the data) or initiate an action (e.g., in accordance with an instruction in the communication, such as an instruction to detect a location of a device).

While operating in the transport layer, interface engine 815 can parse a set of outgoing communication data, add a header (e.g., that identifies one or more port numbers) to generate one or more packets and/or can process one or more incoming packets to identify a destination application, combine packet data and/or route data to the destination application.

While operating in the network layer, interface engine 815 can identify a source IP address for the transmitting device and/or a destination IP address for a destination device. Interface engine 815 can then generate another header with a source IP address and/or a destination IP address.

While operating in the link layer, interface engine 815 can add a data link layer Protocol Data Unit (PDU) to an IP packet and/or can remove a PDU from a message. Interface engine 815 can also transform a communication into bits and control how and when bits of a communication are sent to a physical layer and/or can receive a stream of bits and/or determine whether a transmission occurred.

In some instances, a communication received by interface engine 815 can include one with data relating to a user, object or resource. For example, a communication can include a location of a resource device, user device and/or object and a time; a communication constraint (e.g., relating to a type of preferred or not preferred communication channel; and/or relating to an inclination to receive or to not receive in-person handling of requests) associated with a resource, resource device, user or user device; a real-time availability (e.g., of a resource); a base of information or specification (e.g., a department associated with a resource; and/or a time range that a resource has been performing (e.g., working) for a particular industry, client and/or department).

A status engine 825 can process such communications to update one or more data stores in storage subsystem 810. For example, an object data store 830 can be updated to associate an identifier of an object (e.g., a SKU number or store identifier) or a type of object with the location. As another example, a resource data store 835 can be updated to associate an identifier of a resource or resource device, (e.g., resource name, resource ID or device IP address), a resource specification (e.g., base of information, department, and/or client association) with the location. As yet another example, a user data store (not depicted) can be updated to associate a user identifier (e.g., name or device ID) with the location. The location can include, for example, geographic coordinates, an address, a building identifier, or an intra-building location (e.g., an aisle number).

In some instances, a communication received by interface engine 815 includes a request for a user device. The request communication can be one generated and/or transmitted by the user device in response to detecting an input corresponding to an explicit request for resource communication or can include automatically generated request (e.g., upon detecting that a user device is presenting a particular website, app page or object information). The request communication can include data that includes a location (a "request location", which can include, for example, location data identifying a location, which can include a location identified by a user (e.g., a location identifier as entered by a user) or a location determined by the user device as being the user device's location); an identifier of the user device or corresponding user; and/or other request content.

A location detection engine 840 can extract the location data from the communication and (in some instances) transform the location data into another location-data format (e.g., transforming geographic coordinates into a location identifier or transforming geographic coordinates into an intra-building location). In some instances, location detection engine 840 can facilitate updating a data store to associate the location with an identifier of the user and/or user device, which may include adding a new element to a data store or modifying an existing element (e.g., modifying an element associated with the user or user-device identifier to identify the location).

A content analysis engine 845 can analyze content in a request communication. For example, content analysis engine 845 can extract data elements corresponding to particular types of data. Such data types can include, for example, an address of a URL or app page (e.g., one being presented at a user device when the request communication was generated or transmitted), an object identifier, an identifier of a type of object and/or a type of request being made (e.g., an identifier of a preferred or not preferred type of communication channel).

An object engine 850 can use a result of the content analysis performed by content analysis engine 845 and the extracted (and possibly processed) location detected by location detection engine 840 to identify an object and/or object type and/or to determine whether an object is located within a geographical region. Object engine 850 can perform such identifications and/or determinations by, for example, querying one or more data stores via coordination with a query engine 855.

In some instances, object engine 850 first identifies an identifier of each of one or more objects. An object identifier may be included in the communication, or the communication may include more general information, such as an object type. In these latter instances, object engine 850 may query object data store 830 (via query engine 855) to identify one or more objects of the identified type. Such an action may include, for example, identifying one or more tags based on the request communication and facilitating object data store 830 to be searched for object identifiers associated with the tag. In one instance, a query of object data store 830 for an object includes one or more constraints. For example, a constraint can include a geographic constraint indicating that the search is for objects of a given type associated with an object location that is within a prescribed distance from a point location (e.g., that of the user device).

Object engine 850 can also (e.g., via a same or subsequent query submitted by query engine 855) identify an object location associated with each identified object. The object location can include, for example, geographical coordinates of the object, an intra-building location, an identifier of a particular building at which the object is located and/or a location of a building at which the object is located.

Object engine 850 can also (e.g., via a same or subsequent query submitted by query engine 855) identify additional object data, such as an object name, object attributes, and/or specification.

A scheduling engine 860 can use the object identifier(s) and object location(s) (e.g., and, in some instances other data) to determine whether a resource is to be assigned to process, handle, or respond to a request, which resource is to be assigned and/or a mode of request attention (e.g., a type of communication channel to be initiated and/or whether a task is to be scheduled that indicates that a communication type will change). These determinations can be made in accordance with one or more prioritization rules stored in a prioritization rule data store 865. Prioritization rules may be, for example, client specific (e.g., and set at least in part based on client input), specific to various object types, client non-specific, non-specific across object types, dynamic, learned and/or static. For example, a prioritization rule can specify a technique for calculating an obtainment result (e.g., whether a particular outcome will occur with respect to the object, whether the user associates with the object, whether the user obtains exclusive access to the object) and can specify how a determination is to be made (e.g., determining that a local resource is to be assigned to process, handle, or respond to a request when an obtainment result is above a threshold). Determinations can also depend on one or more other factors, such as a request load, a request time, a user location, a user-specific data, user-set data, and/or an action that initiated the request.

In some instances, an engagement determination (whether a resource is to be assigned to process, handle, or respond to a request, which resource is to be assigned and/or a mode of request attention) may be made based on a comparison analysis as described in U.S. application Ser. No. 09/922,753, filed on Aug. 6, 2001, U.S. application Ser. No. 10/980,613, filed on Nov. 3, 2004 and/or U.S. application Ser. No. 13/413,158, filed on Mar. 6, 2012, each which is hereby incorporated by reference in its entirety. For example, a determination may depend on session information from a user device. As another example, initial determinations can be made to sample a space of possible determinations, and an obtainment parameter can be tracked such that a model can be established to relate various inputs (e.g., user device characteristics, object characteristics, location characteristics, resource allocation, etc.) to one or more obtainment parameters. The model can be used to calculate a value that can indicate when and/or how various resources are to be allocated to improve obtainment objectives (e.g., a high obtainment rate and/or value). As yet another example, a statistical model can be generated using partial-least squares projections to latent structures (PLS), principal component analysis (PCA) or a combination of PLS and PCA. The model can map various inputs (e.g., user device characteristics, object characteristics, location characteristics, resource allocation, etc.) to one or more classes. A class can be indicative of whether resource allocation and/or which type of resource allocation is inferred to be effective to improve an obtainment objective and/or a inferred obtainment parameter (e.g., such that resources can be effectively allocated).

In one exemplary instance, scheduling engine 860 determines whether an object location is within a distance from a request location and/or whether both the object location and request location are within an area (e.g., in a same building or geographical area). When they are not, scheduling engine 860 may determine that a remote resource is to be assigned to process (e.g., handle) the request. When they are, scheduling engine 860 may determine that a local resource is to be assigned to the request. The local resource may include one that is near the object location and/or request location.

Resource assignments may be weighted based on resources' specifications (e.g., to identify resources having a specification corresponding to a request), resources' availability (e.g., to identify resources available during a time range or anticipated to be able to process or handle a request and/or resources' locations (e.g., to identify resources associated with a resource location near an object location or request location). Scheduling engine 860 can communicate with a resource tracking engine 870 to identify resources associated with objects and/or object locations and/or to identify one or more details with respect to those resources (e.g., specifications and/or locations).

In some instances, scheduling engine 860 assigns, for a given request communication, a prioritization value to each of one or more resources (e.g., associated with a particular location and/or specification). The value may be improved (e.g., increased) when a given resource is available, near an object location or request location, has a specification associated with a request-associated object (e.g., is located within in a building in which the object is located), and/or are associated with particular obtainment parameters (e.g., indicating that the resource is likely to facilitate a particular obtainment outcome with respect to the object). A prioritization rule may specify how to generate and/or how to evaluate one or more values. For example, a rule may include one or more threshold and indicate that a type of resource selection (e.g., whether any resource is to be assigned to a request, a type of communication channel that is to be established and/or whether in-person communication is to be provided) depends on whether and/or which threshold(s) are exceeded by any (or a number) of values. As another example, a rule may indicate that a resource with a highest prioritization value from amongst set of resource is to be selected (or conditionally selected) to process or handle a request. In some instances, one or more or all data stores in storage subsystem 810 include real-time data and/or resource tracking engine 870 can evaluate (e.g., based on stored or requested data) real-time data to facilitate request-response determinations.

For example, scheduling engine 860 may identify a particular building as being a building proximate to a user device and in which an object may be located. Resource tracking engine 870 can then determine (e.g., by querying of resource data store 835 via query engine 855) whether any resources are available for engagement or can provide information associated with the object. If a condition is met (e.g., a threshold number of such resources are identified), locations of each such resource can be identified and transmitted to scheduling engine 860 (which may identify an identified resource that is the nearest to a request or object location to process the request).

As another example, scheduling engine 860 may identify a particular building as being a nearest building that has an object available (e.g., in stock). Resource tracking engine 870 can then identify (e.g., by querying of resource data store 835 via query engine 855) a base of information and location for each on-duty resource in the building. A prioritization value can be set for each resource based on a degree to which the base of information corresponds to the object associated with the request and a distance between the resource location and an object or request location.

In some instances, scheduling engine 860 identifies a single resource to process a request and a type of communication channel to establish. Scheduling engine 860 may then generate a task associated with an identifier of the resource (or corresponding resource device), an identifier of the request (and/or a corresponding identifier of a user device, user, object, request location, and/or object location) and/or an identifier of the type of communication channel. Scheduling engine 860 can facilitate updating a task data store 875 to include the task. Such task generation and/or storage may have an effect of indicating that the resource is unavailable for other task assignments (e.g., until the task is identified as being completed or for a time range).

In some instances, a task assignment (indicating that a particular resource is to handle a particular request) is conditioned upon receiving a confirmatory message from a resource device associated with the resource or not receiving a rejection communication from the resource device. For example, initially scheduling engine 860 may identify one or more resources for a request and can facilitate transmitting a communication to a resource device of each resource with an instruction to present a presentation that includes an invitation to process a request, an option to acknowledge or reject and/or one or more request-associated details (e.g., an object, object location and/or request location). Scheduling engine 860 may assign the task to a resource (e.g., a first responding resource) that confirms that the request will be handled Scheduling engine 860 may proceed to identify one or more other resources for a request if, for example, a communication is received from each of the initially identified resource devices that rejects the task and/or if no confirmatory communication is received within a time range.

Upon having selected a resource for a request and/or generating a task, in some instances, a resource handling engine 880 can facilitate resource performance of the task. For example, request handling engine 880 can query relevant request data (e.g., user's name, request location, object, type of content included in the request, object location and/or directions from a location of a resource device to an object location or request location) to be transmitted to the resource device.

As another example, request handling engine 880 can facilitate establishment of a communication channel (e.g., of an identified type) between a resource device associated with the resource and a user device. The communication channel can include, for example, a voice, text or data channel. In various instances, this channel may, or may not, be established even if the resource is to process the request in person. A voice, data or text channel may allow information to be transmitted, such as an indication that the request will be handled, an expected delay before the resource is available, an indication about how to get to the resource, preliminary information that can be provided over the channel, etc.

Request handling engine 880 can facilitate establishment of a communication channel by, for example, participating in a handshake process with one or both the identified resource device and user device. Such communications can be structured in accordance with a protocol, such as a TLS Handshake Protocol. A handshake process can include a three-way protocol and/or can be configured to establish a session. Exemplary communications include a synchronize message, synchronize-acknowledgment message. In some instances, communications involved in establishing the communication channel are interchanged with each of a user device associated with a request and a resource device associated with an identified resource.

In some instances, request handling engine 880 further facilitates transmission of a status communication to a user device, which may (for example) identify an assigned resource, a resource location of the assigned resource, and/or an expected time at which a resource will be available and/or will arrive at a request or object location.

In instances where a resource is to move to a particular location (e.g., object or request location) or a user is to be or has been alerted of a resource location, resource tracking engine 870 can track, subsequent to the task assignment, a location of the resource device associated with the assigned resource. The tracking can facilitate, for example, determining whether the resource is performing the task, providing a user device with an updated resource location, and/or determining whether a task has been completed. For example, resource tracking engine 870 can determine that a resource is performing a task (e.g., providing in-person handling of requests) so long as an established communication channel between the resource device and user device is operable and/or so long as a location of the resource device is within a distance (e.g., five feet) from the user device.

When it is determined that an assigned resource failed to initiate performing a particular task within a predetermined time range, scheduling engine 860 may generate a new task assignment for the request identifying a different resource. When it is determined that a task has been performed, request handling engine 880 may facilitate updating of task data store 875 accordingly and/or updating resource data store 835 to indicate that the resource is accessible.

A obtainment analysis engine 885 can retrieve or query obtainment data relating to a request that may indicate whether an "obtainment" (e.g., purchase) was made (e.g., within a time range upon having received the request, within a time range upon task completion and/or before the user device left a geographic area), an obtainment value, a number of obtainments, whether a request-associated object was included in the obtainment. The possible obtainment can include one made at a particular location (e.g., at a building), by phone, via an established communication channel or on a web page.

Obtainment analysis engine 885 can facilitate updating of obtainment data store 890 to include obtainment data related to individual requests (e.g., associating an identifier of a request with an identifier of one or more of an associated: object, object type, client, assigned resource, type of communication channel established, whether in-person handling of requests was provided, request-response task time range, obtainment result, obtainment value and/or obtainment time). Obtainment analysis engine 885 can use such obtainment data to generate a obtainment parameter (e.g., obtainment probability, average or median obtainment value, obtainment quantity, etc.) relating to an object type, object, resource, resource type (e.g., local or remote, having a request-comparison base of information or specification or not), task time range, type of communication channel established, whether in-person facilitation of requests was provided, and/or user-location details (e.g., whether a user is in a building or a distance from an object location).

Obtainment parameters can be used to identify a resource, resource type, communication-channel type and in-person decision for a request. For example, a determination as to whether a resource should be provided in response to a request, a type of resource that is to be provided, a type (if any) communication channel that is to be established and/or whether a resource is to process a request in person may be influenced based on obtainment parameters associated with various possible determinations. One or more obtainment parameters (e.g., for a client-identified resource, resource type, object, object type, communication-channel type and/or in-person indication) may further be presented to a client.

Figure 9:
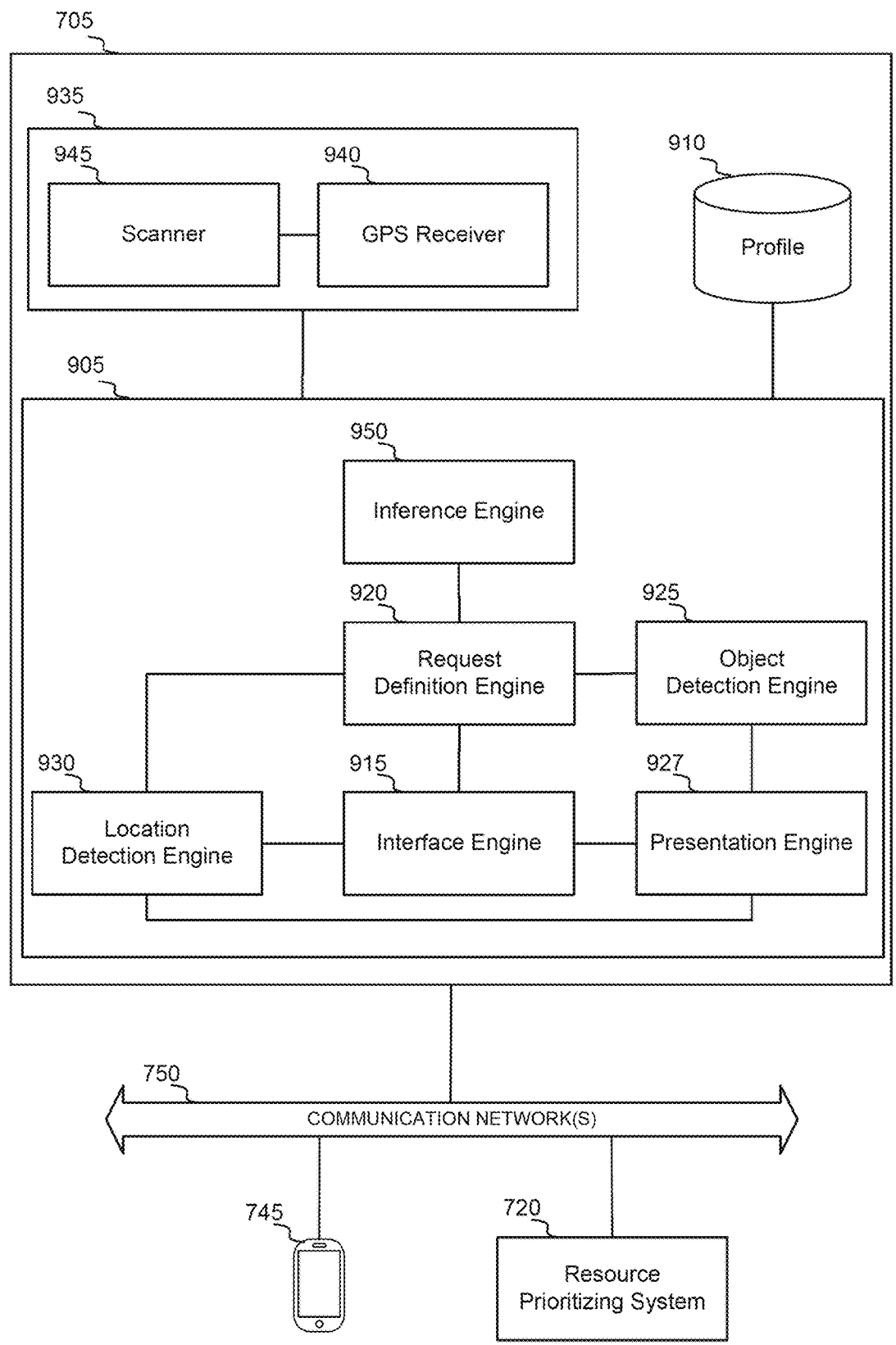
FIG. 9 depicts a block diagram of an embodiment of a user device.

FIG. 9 depicts a block diagram of an embodiment of user device 705. Generally, user device 705 can include an engine subsystem 905, which includes multiple engines. Engine subsystem 905 can include or can use one or more processors in user device 705. One or more engines in engine subsystem 905 can retrieve data from, store data in, update data in, and/or delete data from a data store in a storage subsystem. The storage subsystem can include, for example, an operating system, one or more apps and/or one or more data stores (e.g., a profile data store 910), which may include relational data stores.

Engine subsystem 905 can include an interface engine 915 configured to receive incoming communications, generate communications and transmit outgoing communications. Communications can be received and/or transmitted via one or more networks 750 from or to a device, such as a resource device 745 and/or resource prioritizing system 720. Interface engine 915 can operate within one or more layers in a protocol stack, such as an application layer, transport layer, Internet layer and/or link layer. Interface engine 915 can include some or multiple properties, functions and/or configurations as described in relation to interface engine 815.

One type of communication that may be transmitted by interface engine 915 includes a request communication. A request communication can be generated by a request definition engine 920 based on an object identified by an object detection engine 925 and, in at least some instances, a request location detected by a location detection engine 930. The request location can include, for example, geographic coordinates, an address, a city, a zip code, a building, an intra-building location, a location and/or a location associated with an object or requested performance.

Object detection engine 925 can identify an object type, for example, based on an object and/or type of object being presented (via a presentation generated by a presentation engine 927 and presented on a display of user device 705) on a URL or app page. For example, if a user device is presenting Object X of Object Type Y on a website of Client Z, a request communication may include an identifier of each of one or more of Object X, Object Type Y and Client Z.

Location detection engine 930 can detect a location of user device based on, for example, input having been detected (e.g., identifying a present location or "home" location) and/or based on data detected by a sensor subsystem 935. In one instance, sensor subsystem 935 can be configured to detect a signal from each of one or more sensors or receivers and to determine a location based on the detection, a signal strength of the signal and/or a time of receipt of the signal. For example, sensor subsystem 935 can include a GPS receiver 940 that can receive signals from each of a plurality of GPS satellites and can determine a current location based on a triangulation technique using a transmission delay of each signal. As another example, sensor subsystem 935 can include a receiver to detect a signal from a client device and approximate a location of user device 705 as being that of the client device (e.g., which may be identified in the signal). As still another example, sensor subsystem 935 can include a receiver configured to receive signals from one or more WiFi access spots, and a location can be determined based on one or more signal sources, signal strengths and/or signal latencies. As yet another example, sensor subsystem 935 can include a scanner 945 to detect a proximate object code (e.g., barcode or QR code) or other object data and can determine a location of user device 105 as being one associated with the identified object.

In some instances, location detection engine 930 can determine (e.g., estimate) a location of user device 705 based on data received by a scanner 945. For example, scanner 945 can be configured to detect a code, barcode or other data from an object. In some instances, the scanned data itself includes an identification of location. In some instances, scanned data can be associated with a location. Scanner 945 can include, for example, a camera, QR reader and/or a laser scanner.

A request communication can further include information about user device 705 and/or an associated user. For example, a profile data store 910 can include, for example, an identifier of a user, a communication-channel constraint or restriction (e.g., indicating that a virtual chat communication channel is not to be used), a demographic, previous obtainments, an object-type constraint, previous location(s) and/or a home location. A request communication can include data from profile data store 910.

In some instances, an object is identified, a request is set and/or a request it transmitted upon a detection that a user device is presenting a particular URL or app page. In some instances, an object is identified, a request is set and/or a request is transmitted upon a detection that a user device upon a detection that an input has been provided corresponding to a request to provide a resource (and/or particular type of resource attention). For example, a URL or app page can include an option for a user to select to request to communicate with a resource (e.g., generally, generally about the object or in relation to a specific topic relating to the object).

In some instances, an object is identified, a request is set and/or a request is transmitted upon generation of an indication by an inference engine 950. An indication can include one that, for example, indicates that a user would like to communicate with a resource (e.g., generally or in a particular manner) and/or a user requests additional information regarding a particular object or object type. Inference engine 950 may generate such an indication based on, for example, a location of user device 705 (as detected by location detection engine 930), a range of time that user device 705 has remained within a particular geographic area (e.g., a 2-foot radius within a building), a web page or app page being presented on user device 705, a range of time that a user has been viewing a web page or app page and/or a query entered by a user. For example, if a user requests directions to a building after viewing a web page associated with an object for at least a predetermined time range, it may be inferred that the user would like to communicate with a resource device regarding the object.

Subsequent to interface engine 915 transmitting a request transmission, interface engine 915 may receive a request-responsive communication, which may identify, for example, one or more of an assigned resource and/or device, an identified object location, a resource location and a type of communication channel. The request-responsive communication can also or alternatively include an instruction, such as an instruction to present a presentation (e.g., a visual, audio and/o/r haptic presentation). In some instances, the presentation can include presentation data (e.g., included in and/or derived from data in the request communication), which may identify a resource (e.g., by name and/or specification), resource specification, resource location, directions to a resource location, determined resource return time, and/or type of communication(s) to be expected.

Interface engine 915 can further receive one or more incoming signals to establish (e.g., in coordination with one or more outgoing signals) a communication channel. The signals can be configured to establish, for example, a phone, chat, text or data communication channel. In one instance, an incoming signal includes a phone call. In one instance, the one or more incoming signals facilitate a data connection.

For example, the one or more incoming signals can be part of a handshaking process to identify parameters (e.g., information transfer rate, coding alphabet and/or interrupt procedure) for the channel. Such communications can be structured in accordance with a protocol, such as a TLS Handshake Protocol. A handshake process can include a three-way protocol and/or can be configured to establish a session. Exemplary communications include a synchronize message, synchronize-acknowledgment message. In some instances, communications involved in establishing the communication channel are communicated with resource prioritizing system 720. Nonetheless, once the channel is established, it may be used to communicate with resource device 745. In some instances, communications involved in establishing the communication channel are communicated with resource device 745.

Figure 10:
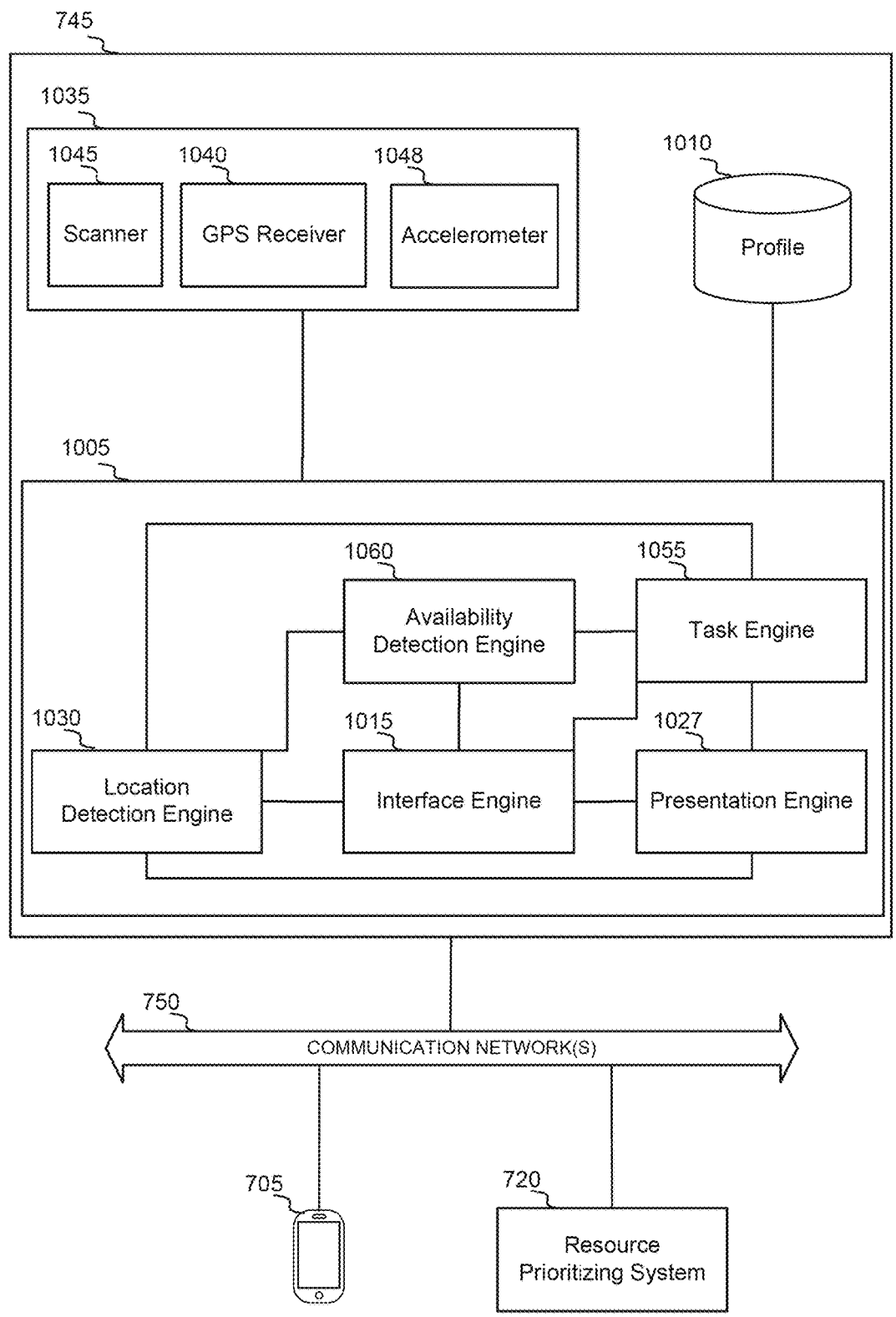
FIG. 10 depicts a block diagram of an embodiment of a resource device.

FIG. 10 depicts a block diagram of an embodiment of resource device 745. Generally, resource device 745 can include an engine subsystem 905, which includes multiple engines. Engine subsystem 1005 can include or can use one or more processors in resource device 745. One or more engines in engine subsystem 1005 can retrieve data from, store data in, update data in, and/or delete data from a data store in a storage subsystem. The storage subsystem can include, for example, an operating system, one or more apps and/or one or more data stores (e.g., a profile data store 1010), which may include relational data stores.

Engine subsystem 1005 can include an interface engine 1015 configured to receive incoming communications, generate communications and transmit outgoing communications. Communications can be received and/or transmitted via one or more networks 150 from or to a device, such as a user device 705 and/or resource prioritizing system 720. Interface engine 1015 can operate within one or more layers in a protocol stack, such as an application layer, transport layer, Internet layer and/or link layer. Interface engine 1015 can include some or multiple properties, functions and/or configurations as described in relation to interface engine 815.

One type of communication that may be transmitted by interface engine 1015 includes a location communication. A location communication can include a location of resource device 745 and an identifier of resource device 745 (and/or a corresponding resource). The location communication may further include a time and/or other information.

The location can be determined by a location detection engine 1030. The location can include, for example, geographic coordinates, an address, a building, an intra-building location, a commercial location and/or a location within a commercial location. Location detection engine 1030 can detect a location of resource device 745 based on, for example, input having been detected (e.g., identifying a location, an assigned location) and/or based on data detected by a sensor subsystem 1035.

In one instance, sensor subsystem 1035 can be configured to detect a signal from each of one or more sensors or receivers and to determine a location based on the detection, a signal strength of the signal and/or a time of receipt of the signal. For example, sensor subsystem 1035 can include a GPS receiver 1040 that can receive signals from each of a plurality of GPS satellites and can determine a particular location based on a triangulation technique using a transmission delay of each signal. As another example, sensor subsystem 1035 can include a receiver to detect a signal from a client device (e.g., a signal transmitter or computer, such as one at an information center) and approximate a location of resource device 745 as being that of the client device (e.g., which may be identified in the signal). As still another example, sensor subsystem 1035 can include a receiver configured to receive signals from one or more WiFi access spots, and a location can be determined based on one or more signal sources, signal strengths and/or signal latencies. As yet another example, sensor subsystem 1035 can include a scanner 1045 to detect a proximate object code (e.g., barcode or QR code) or other object data and can determine a location of user device 705 as being one associated with the identified object.

In some instances, location detection engine 1030 can determine a location of user device 705 based on data received by a scanner 1045. For example, scanner 1045 can be configured to detect a code, barcode or other data from an object. In some instances, the scanned data itself includes an identification of location. In some instances, scanned data can be associated with a location. Scanner 1045 can include, for example, a camera, QR reader and/or a laser scanner.

In some instances, location communications may be generated and/or transmitted repeatedly, continuously and/or regularly. For example, a location can be determined every minute, and a location communication with the determined location can be determined every minute. In some instances, a location is conditionally determined and/or a location communication is conditionally transmitted. For example, an accelerometer 1048 may continuously or regularly generate or obtain acceleration readings. When an above-threshold acceleration is detected, location detection engine 1030 may determine a location (e.g., and not otherwise). As another example, a location communication may be transmitted (e.g., only) when location detection engine 1030 determines that resource device 745 has moved by at least a threshold distance relative to a previous location determination.

In some instances, interface engine 1015 receives a task communication. A task communication can identify one or more details relating to a task (e.g., an assigned task or a task provided for assignment), such as, for example, a request location, an object, an object location, a type of communication channel and/or whether in person handling of requests is to be provided. Thus, for example, a task communication may indicate that the task includes going to a request location in Region 10 to communicate with a user who is requesting information regarding an object, and that these objects are located in Region 10 and in a front area of the building. As another example, a task communication received at a resource device may indicate that the task includes communicating using a voice communication link with a user device.

Upon receiving the task communication, a presentation engine 1027 may present (e.g., on a display of resource device 745) one or more details relating to the task (or proposed task) and/or included in the task communication. In some instances, a task engine 1055 determines one or more additional pieces of information (which may be presented) based on data in the task communication. For example, task engine 1055 may calculate a time that it will take to arrive at a specified location, a task-involvement time and/or an obtainment probability. As another example, task engine 1055 may generate or modify a map (e.g., of a building) to identify a request location, object location and/or a resource location.

In some instances, a presentation can be accompanied with one or more selectable options, such as an option to reject the task and/or an option to acknowledge (e.g., accept) the task. Detecting a selection of such an option can cause task engine 1055 to generate a task-response communication identifying the selected response as well as, for example, resource device 745, an associated resource and/or a location of resource device 745. Interface engine 1015 can facilitate transmission of the task-response communication to resource prioritizing system 720.

Task engine 1055 can also track performance of a task (e.g., one that has been assigned and/or acknowledged). For example, task engine 1055 can track a location of resource device 745 relative to any destination location (e.g., request location or object location) corresponding to the task. Task engine 1055 may also monitor one or more of various task-performance time ranges, such as a time that it took to arrive at a destination location, a time spent at a destination location, a time that resource device 745 was within a distance from a user device and/or object associated with the task, and/or a time until a task-completion input is received at resource device 745. Task engine may also track other task characteristics, such as one or more other objects visited during task performance (e.g., which may be inferred upon detecting that resource device 745 moved with a user device to a location of a new object and remained relatively fixed at the new object location for at least a time range).

Task engine 1055 can generate a task-data communication corresponding to one or more of the tracked task variables, and interface engine 1015 can facilitate transmission of the task-data communication to resource prioritizing system 720. Such variables may be used by resource prioritizing system 720 to influence subsequent resource selections (e.g., a resource selection weighting towards resource selections to those who are quick to arrive at destination locations) and/or request-response strategies (e.g., to prioritize requests associated with objects where resource provisions are likely to cause a user to visit multiple objects). A resource selection weighting towards a resource can correspond to preferring selection of that resource over others.

Interface engine 1015 can further receive one or more incoming signals to establish (e.g., in coordination with one or more outgoing signals) a communication channel. Such signals may be received, for example, subsequent to a task assignment or acknowledgment. The signals can be configured to establish, for example, a phone, chat, text or data communication channel. In one instance, an incoming signal includes a phone call. In one instance, the one or more incoming signals facilitate a data connection.

For example, the one or more incoming signals can be part of a handshaking process to identify parameters (e.g., information transfer rate, coding alphabet and/or interrupt procedure) for the channel. Such communications can be structured in accordance with a protocol, such as a TLS Handshake Protocol. A handshake process can include a three-way protocol and/or can be configured to establish a session. Exemplary communications include a synchronize message, synchronize-acknowledgment message. In some instances, communications involved in establishing the communication channel are communicated with resource prioritizing system 720. Nonetheless, once the channel is established, it may be used to communicate with a user device 705 associated with a task. In some instances, communications involved in establishing the communication channel are communicated with user device 705.

A communication channel (e.g., a phone or data communication channel) may be established even if in-person handling of requests is to be provided in response to a task, as it can provide a user with an opportunity to ask questions about an object while a resource is moving towards an object or request location or while a user is moving to a resource location. The channel may also allow a resource to communicate a progress in moving towards a destination location and/or provide directions to the user to arrive at an object location or resource location. In some instances, a resource that is to provide in-person handling of requests is a same resource that is to communicate with a user over an established communication channel. In some instances, a different resource communicates over the communication channel as compared to one to provide information in person. This may allow the user to be communicated with over a data channel and not to interfere with the in-person-resource's walking. In such instances, the resource devices may also be connected (e.g., via resource prioritizing system 720 or not; and via a same channel as one connected to a user device or not), such that information relating to the request may be relayed to the in-person resource.

An availability detection engine 1060 can determine whether a resource corresponding to resource device 745 is (or will be) available for a task assignment. Availability detection engine 1060 may evaluate, for example, a location of resource device 745 (e.g., where availability inferences may be supported when resource device 745 is in a building and/or more than a threshold distance from a most recent task destination location and/or more than a threshold distance from a user device), a movement of resource device 745 (e.g., where availability inferences may be supported when resource device 745 has a recent average velocity or acceleration below a threshold) and/or a signal received at resource device 745 (e.g., where availability inferences may be supported when a signal from a user device corresponding to a recent request is not detected and/or when a strength of such signal falls below a threshold or has a decrease in strength exceeding a threshold). Availability detection engine 1060 can further or alternative detect availability or unavailability based on input detected at resource device 745. For example, a graphical user interface may be presented on a display (via presentation engine 1027) that can enable a resource to enter inputs indicating task initiation, unavailability, task completion and/or availability.

In some instances, an availability communication can be transmitted (via interface engine 1015) to resource prioritizing system 720 that can identify whether the resource is available and/or that an availability or resource 745 has changed. An availability communication can include an indication as whether the resource is available, an identifier of resource device 745 and/or associated resource and/or a present time. Such an availability communication can be generated and/or transmitted, for example, at routine, regular and/or continuous times. In one instance, a location communications can also include availability data.

In some instances, task engine 1055 can use availability data to automatically determine whether a task identified in a task communication is to be acknowledged (e.g., accepted) or rejected. For example, tasks may be automatically rejected when it is detected that a resource is unavailable. Task confirmations may be, in various instances, automatically acknowledged otherwise or only acknowledged upon receiving input from a resource that the task is acknowledged.

It will be appreciated that the block diagrams depicted in FIGS. 8-10 are illustrative. Additional components (e.g., one or more processors, a display, a touchscreen, a keyboard, a speaker and/or a battery) even if they are not depicted. Further, a component depicted in one device and/or system may additionally or alternatively be provided in another device. For example, object engine 850 may be provided in user device 705.

Figure 11:
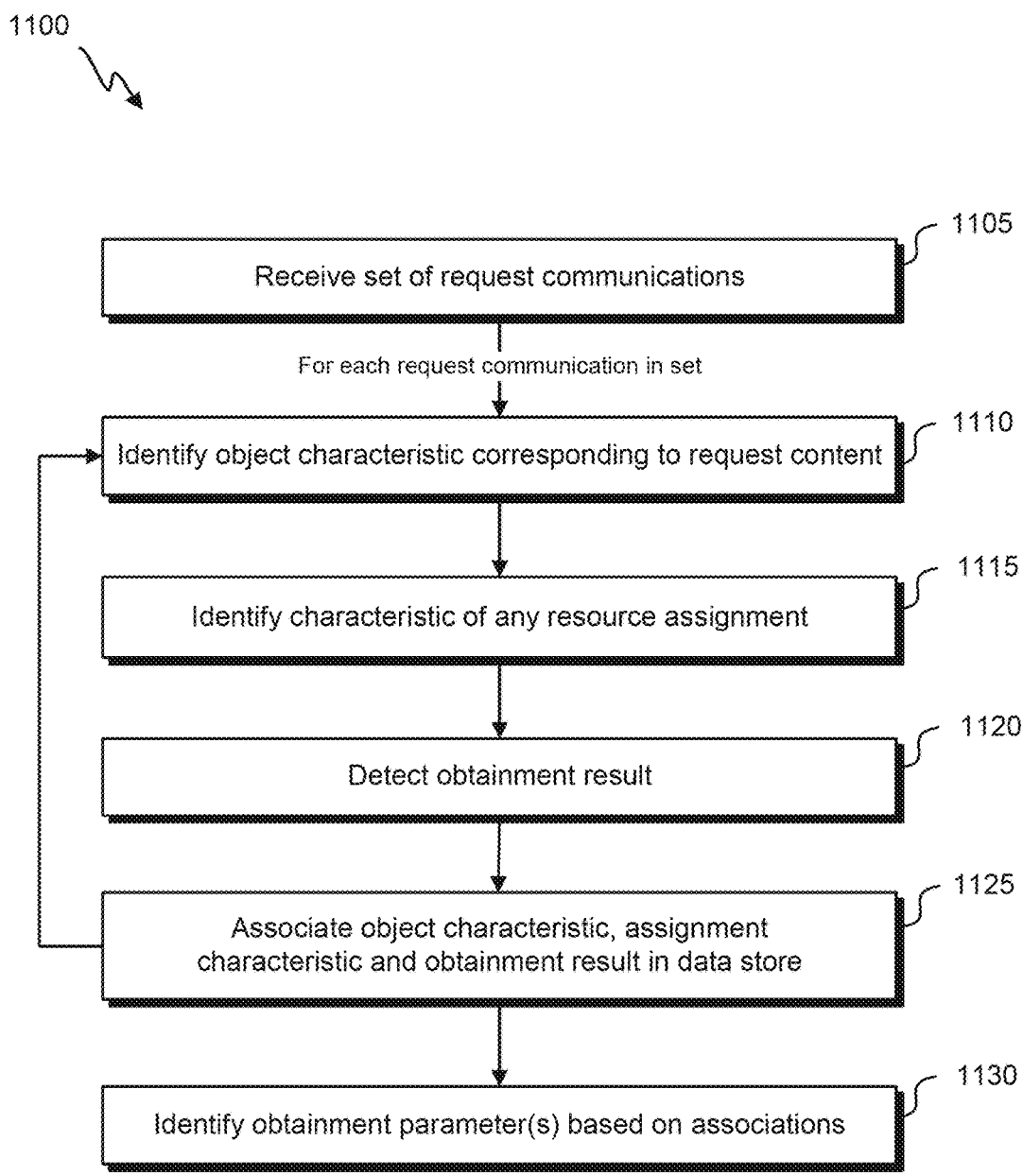
FIG. 11 illustrates a flowchart of an embodiment of a process for generating obtainment parameters.

FIG. 11 illustrates a flowchart of an embodiment of a process 1100 for generating obtainment parameters. Process 1100 can be performed, in part or in its entirety, by resource prioritization system 720.

Process 1100 begins at block 1105 where interface engine 815 receives set of request communications. Each request in the set of request communications can be received from a user device, can relate to an object and/or can correspond to a request for information. Each request in the set of request communications may be received during a time range. In some instances, the request communications in the set of request communications need not be received simultaneously.

Blocks 1110-1125 can then be performed for each request in the set of request communications. At block 1110, object engine 850 identifies an object corresponding to request. The identification can be performed using data in request communications, such as a request location as determined and/or extracted by location detection engine 840 and/or request content (and/or processed versions thereof) identified by content analysis engine 845. In some instances, for example, an object can include one corresponding to an object, object type, and/or URL or app page identified in the request communication. In some instances, identifying the object can include generating and performing (via query engine 855) a query of object data store 830).

At block 1110, scheduling engine 860 identifies any resource assignment for request. For example, scheduling engine 860 may determine whether a resource was assigned or is being assigned for the request. If not, the characteristic can indicate that no resource was assigned. If so, scheduling engine 860 can identify, for example, a specification of an assigned resource, a location of an assigned resource and/or a location of an assigned resource. Scheduling engine 860 may further identify a type of assignment made, such as whether a resource is to communicate with a user associated with a request via a communication channel (and, if so, what type) and/or to communicate with the user at the user location. In some instances, the identification is performed by retrieving data from task data store 875. In some instances, the identification is made (e.g., in real-time) as a request communication is being evaluated for assignment.

At block 1120, obtainment analysis engine 885 detects one or more obtainments associated with the request. For example, block 1120 can include detecting whether a user obtained a request-associated object (e.g., at a particular website or building) and/or an object of a request-associated object type (e.g., at a particular building) within a time range from a request time and/or on a request-associated day. Block 1120 can further or alternatively include detecting an attribute of and/or number of items in an obtainment made by a request-associated user at a given building and/or in a time range. In some instances, the detection is performed by retrieving data from obtainment data store 890. In some instances, the detection is made (e.g., in real-time) as obtainment data is detected.

At block 1125, the object characteristic, assignment characteristic and obtainment result are associated in a data store (e.g., obtainment data store 890). The data may further be accompanied by, for example, a request time, type of request, user characteristic, client (e.g., store, such as a client associated with a building) identifier and/or other information.

At block 1130, obtainment analysis engine 885 identifies one or more obtainment parameters based on the associations. For example, obtainment analysis engine 885 may use a model and/or fitting technique to generate one or more model variables and/or fitting variables indicative about which characteristics influence obtainment results, in which circumstances and/or to what extent. For example, a linear, non-linear, logistic, regression, support-vector-machine and/or neural-network model may be used. As another example, an obtainment parameter may be generated in relation to each of one or more variables. For example, an obtainment parameter may be generated for a single resource that indicates an extent to which tasks assigned to that resource were likely to lead to positive obtainment results relative to task assignments to other resources (e.g., controlling for other factors).

Figure 12:
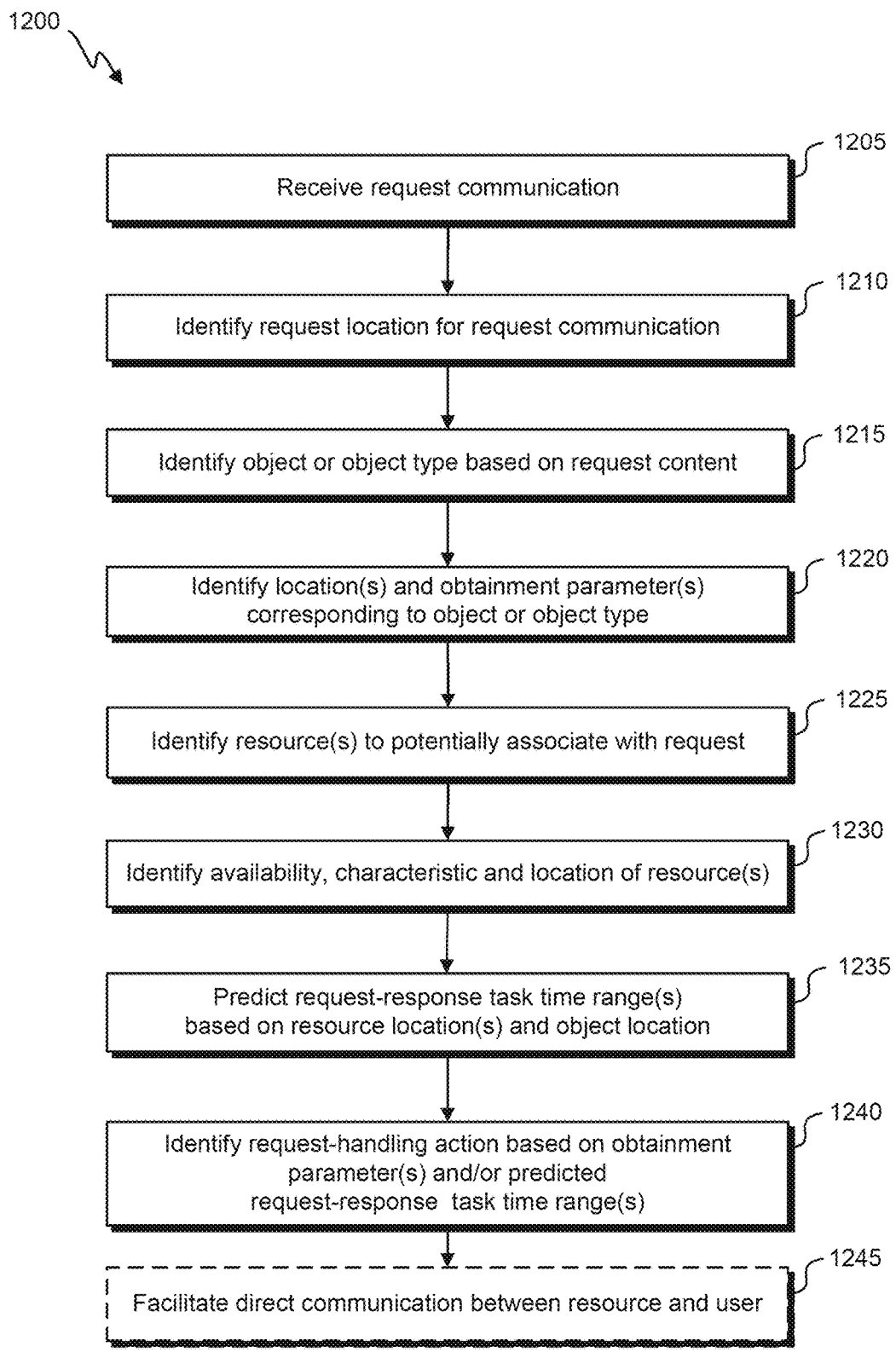
FIG. 12 illustrates a flowchart of an embodiment of a process for facilitating resource assignments responsive to request communications.

FIG. 12 illustrates a flowchart of an embodiment of a process 1200 for facilitating resource assignments responsive to request communications. Process 1200 can be performed, in part or in its entirety, by resource prioritization system 720.

Process 1200 begins at block 1205 where interface engine 815 receives a request communication from a user device. At block 1205, location detection engine 840 identifies a request location for the request communication. For example, location detection engine 840 may extract data from the request communication that includes an object identifier, object type identifier, object name, object-associated term, object tag, URL address, app page identifier and/or client identifier. Such data may be, for example, in a header, metadata or message content.

At block 1215, object engine 850 identifies an object or object type corresponding to request. In one instance, block 1215 includes extracting an identifier of the object or object type from the request communication. In one instance, block 1215 includes associated extracted data (e.g., query terms) with one or more other data (e.g., object identifier, object-type identifier and/or object type). In one instance, block 1215 includes modifying a degree of specificity relative to request content (e.g., identifying an object type based on an object identifier).

At block 1220, object engine 850 identifies one or more locations and one or more obtainment parameters corresponding to the object or the object type. In some instances, object data store 830 can associate object identifiers, types, tags, names, and/or model identifiers with one or more locations. Thus, a query (e.g., with an object identifier, identifier of an object type or object tag) can be initiated (e.g., and performed via query engine 855) to identify one or more locations associated with the identified object or object type. In some instances, all object locations associated with the identified object or object type are identified. In some instances, one or more additional constraints are enforced. For example, a request can relate to Object (or Object Type) X, and object data store 830 can indicate that Object (or Object Type) X is associated with 15 object locations. All such object locations may be returned or those that comply with a query constraint (e.g., object locations within a distance from the request location) can be returned.

The obtainment parameter(s) may be identified, for example, by initiating a query of obtainment data store 890. A result of the query may include, for example, one or more averages, medians, ranges, probabilities, weights of dependent variables and/or model variables. Thus, in some instances, a query result can include an indication as to which types of resource assignments are likely to produce desired obtainment results as it relates to the object or object type and/or one or more other request-associated details. For example, an obtainment result may include model variables that, when used to generate a model output using request-associated variables, indicate that an obtainment probability is 90% if in-person handling of requests is provided as compared to 40% if only communication-channel support is provided as compared to 30% if no handling of requests is provided.

At block 1225, scheduling engine 860 identifies one or more resources to possibly associate with the request communication. For example, the one or more resources can include one or more resources associated with a client location that includes the object (e.g., a building in which the object is located) or an object of the object type; one or more remote resources (e.g., at a call center) associated with a particular client location that includes the object or an object of the object type; resources determined to be generally available for request acknowledgment during a time range; and/or resources having a specification corresponding to the object or the object type. Such resources may be identified, for example, by facilitating a query of resource data store 835. In some instances, the one or more resources can include resources associated with varied location stationing. For example, resources may be located in different countries, cities, and/or buildings.

At block 1230, resource tracking engine 870 identifies, for at least one (e.g., or each) of the one or more resources, an availability, characteristic and location. In some instances, an availability is determined by via a query of resource data store 835. For example, resource tracking engine 870 may manage resource data store 835 to represent availabilities as indicated based on incoming availability communications, and a query may be to identify an availability status of one or more particular resources or to identify any available resources (e.g., amongst the one or more particular resources).

The characteristic may include, for example, whether the resource has a specification that relates to the object or object type and/or one or more specifications associated with the resource. The characteristic can be identified via a query of resource data store 835. For example, a resource may be assigned to Department X in a building, and Department X may physically store Objects A-H. When a request identifies Object D, the resource's association with Department X may indicate that he has a base of information and/or specification relating to the object.

The location can be determined, for example, by querying resource data store 835. For example, resource tracking engine 870 may update resource data store 835 to update a resource location associated with a resource and/or resource device upon receiving a location communication. As another example, resource tracking engine 870 may facilitate transmission of location requests to each of the at least one resources, and a resource location can be identified based on a response.

At block 1235, scheduling engine 860 calculates or sets, for each of the one or more resources, one or more request-response task time ranges. The one or more request-response time ranges may include, for example time passed communicating with a user over a communication channel, time passed getting to a destination location associated with the request, time spent communicating with a user in person, time passed moving from a request-associated location (e.g., the destination location or one moved to during request processing) to a base location, and/or a combination of one, more or all of these times.

The calculations can be based on the resource location and the location of object, and can be further or alternatively based on past request-processing data (e.g., relating to a given resource, resource type, in-person nature, communication-channel type, object, object type and/or resource specification).

At block 1240, request handling engine 880 determines a request-handling action. Determining the request-handling action can include, for example, determining whether a resource is to be assigned to process a request, determining whether a local or remote resource is to be assigned to process a request, determining whether a resource is to process a request, at least in part, in person, determining whether a resource is to process a request, at least in part, via a communication channel, determining a type of communication channel and/or determining a resource to process a request.

In one instance, the determination includes analyzing the obtainment parameter(s) corresponding to the object. For example, if an obtainment probability and/or value is low, and a resource load is high, it may be determined that no resource is to handle a request, that a remote resource is to handle a request, that in-person handling is not to be provided and/or that a high-throughput communication-channel (e.g., a virtual channel as opposed to a phone channel) is to be used. Such determinations may rely on one or more absolute or relative thresholds.

In one instance, determining the request-handling action includes determining a resource to, at least in part, process the request. This resource determination can include analyzing a value associated with the request. In one instance, a prioritization value is associated with each of the one or more resources. The value may be improved (e.g., increased) when a given resource is available, located proximate to an object location or request location, is associated with a particular request-response task time range, has a background associated with a request-associated object (e.g., is located in a building storing the object), and/or are associated with a particular obtainment parameter (e.g., indicating that the resource is likely to facilitate a particular event). The value may be determined based on a prioritization rule.

Determining the resource may include determining a resource with a value above a threshold and/or a highest value (or a value amongst a predetermined or dynamically determined number of highest values). In some instances, a task communication is transmitted to a resource device of the determined resource that may provide the resource with an opportunity to acknowledge and/or reject task performance. For example, a task communication can be sent to multiple resource devices (e.g., those associated with a set of higher values) and a first to respond may be assigned the task.

Task details can be communicated to an assigned user device via a task communication. Task details can include, for example, data about a user, an identifier of an object or object type, an object location, request location, type of request (e.g., information sought), and/or how the resource is to communicate with the user.

In some instances, (e.g., when it is determined that a request is to be responded to, at least in part, by a resource), request handling engine 880 facilitates direct communication between the identified resource and user associated with the request at block 1245. The facilitation may include, for example, establishing a communication channel between the resource device and the user device, transmitting a location of the resource to a device of the user and/or transmitting a location of the user to a device of the resource.

Figure 13:
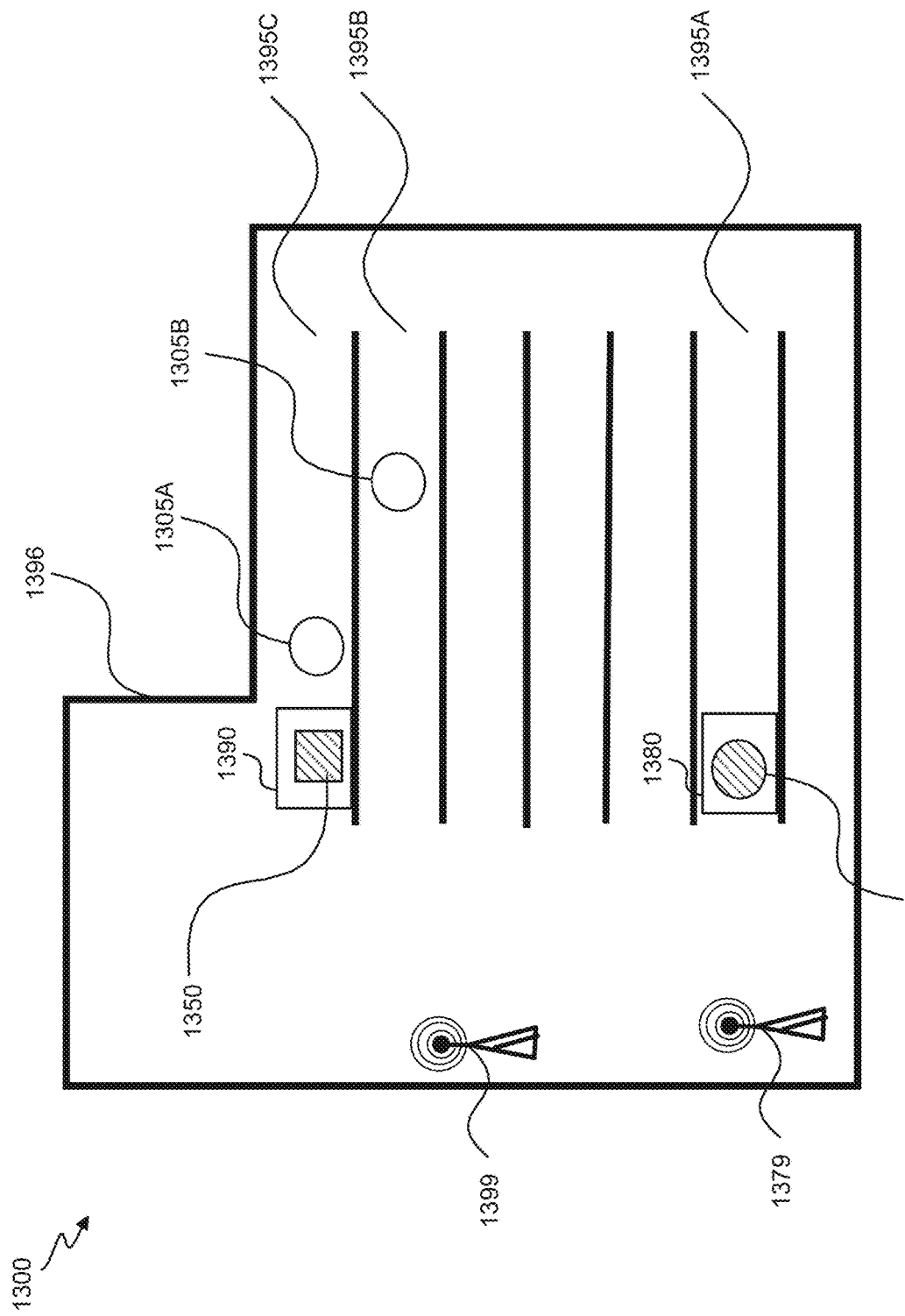
FIG. 13 illustrates an interaction environment pertinent to request processing according to one embodiment.

FIG. 13 illustrates an interaction environment 1300 related to request processing according to one embodiment. The environment 1300 includes a building 1396 (e.g., a store) having at least regions 1395A-C (e.g., an aisle). User 1345 is in region 1395A, resource 1305B is in region 1395B, and resource 1305A is in region 1395C. Object 1350 is in region 1395C. For this example, user and user device are shown as a single component 1345. As discussed herein, one or more sensors can be used to provide information about the user, the resources that can be provided, and a subject of the inquiry.

In an example, shown in FIG. 13, user 1345 (e.g., the source of the request for information from resources located in building 1396) requests information on a particular object type available at building 1396. Resources 1305A-B are agents within the building who can provide information relating to objects (e.g., they can be a resource to provide specific information about the object). In an embodiment, one type of support that can be provided by resources 1305A-B to users is that they can provide particular information about different types of objects (e.g., capacity, colors available, size, requested performance documents available, and other suitable information about the object).

In this embodiment, object location 1390 is the location of object 1350 (e.g., a product) within building 1395. In FIG. 13, the user device associated with user 1345 and the resource devices used by resources 1305A-B can be coupled to a network using wireless access point 1379. In some embodiments, wireless access point 1379 is configured to support one or more types of wireless communication, such as using WiFi (IEEE 802.11 family standards), Bluetooth® (a family of standards promulgated by Bluetooth SIG, Inc.), BLE, near-field communication (implementing the ISO/IEC 18092 standards or the like), or any other suitable communications protocol.

As shown in FIG. 13, the locations of user 1345 and resources 1305A-B are inside building 1396. The items shown in FIG. 13 (e.g., the relative positions of user 1345 and resources 1305A-B) represent a portion of the information stored, maintained and/or used by components as real-time resource information, discussed above. In some embodiments, a higher level of position accuracy may be achieved indoors by using an indoor proximity system 1399. One example of an indoor proximity system may include IBEACON™ detection technology by Apple, Inc. of Cupertino, Calif. It will be appreciated that other technologies may be used. Indoor proximity system 1399 can track the user device held by user 1345 and the resource devices used by resources 1305A-B. In an embodiment, object 1390 can also be tracked by indoor proximity system 1399, and object location 1390 can be identified based on the additional accuracy.

In an example, a user (e.g., user 1345) is searching for the particular object noted above (e.g., a refrigerator) at building 1396. Not being able to find the object, user 1345 uses a user device to get additional information about the object. An embodiment of a device application operating on user device locates user 1345 in region 1395C (user location 1380) using indoor proximity sensor 1399, and provides user 1345 with an option to request more information about the object in which information is required. User 1345 can select an option for more information, and a request communication can be transmitted to a resource prioritizing system (e.g., resource prioritizing system 720), where the request may be processed.

In this example, resource prioritizing system 720 identifies object location 1390 as being associated with the request communication. Though not shown in FIG. 13, other object locations in building 1396 could exist (e.g., in an inaccessible storage room, high up on a storage shelf, or any other similar inaccessible circumstance), and different factors may be evaluated to determine which location(s) are to be associated with the request communication. For example, locations that are near to user 1345, are in building regions and/or are near at least a number of resources may be preferentially identified relative to others.

In this example, once object location 1390 is selected, available resources familiar with the subject can be identified and prioritized. In this example, resources 1305A-B are both nearby object location 1390 and familiar with object 1390. Resource prioritization system 720 can prioritize resources 1305A-B based on background information (e.g., resource experience, requested performance proficiency, or other suitable background information) stored in a resource data store in association with identifiers of the resources and real-time (or near real-time) information (e.g., real-time information such as the respective distances of resources 1305A-B from object 1350, the accessibility of object 1350, or other suitable real-time information). In this example, resource 1305A may be prioritized higher than resource 1305B at least because object 1350 and resource 1305A are in the same region 1395C, and resource 1305A is more proximate to object 1350. Based on this prioritization, resource 1305A can be identified for processing the request, and this selection facilitates an establishment of a direct communication channel between resource 1305A and user 1345. In some embodiments, in addition to the communication between resource 1305A and user 1345, directions are generated and sent to user 1345 to guide movement from region 1395A to object location 1390. These directions could come in different forms, such as a notification to user 1345 of the region 1395C location of object 1350.

It should be appreciated that the environment 1300 may have other components than those depicted. Further, the embodiment shown in the figure is only one example of an environment that may incorporate an embodiment of the invention. In some other embodiments, the environment 1300 may have more or fewer components than shown in the figure, may combine two or more components, or may have a different configuration or arrangement of components.

Figure 14:
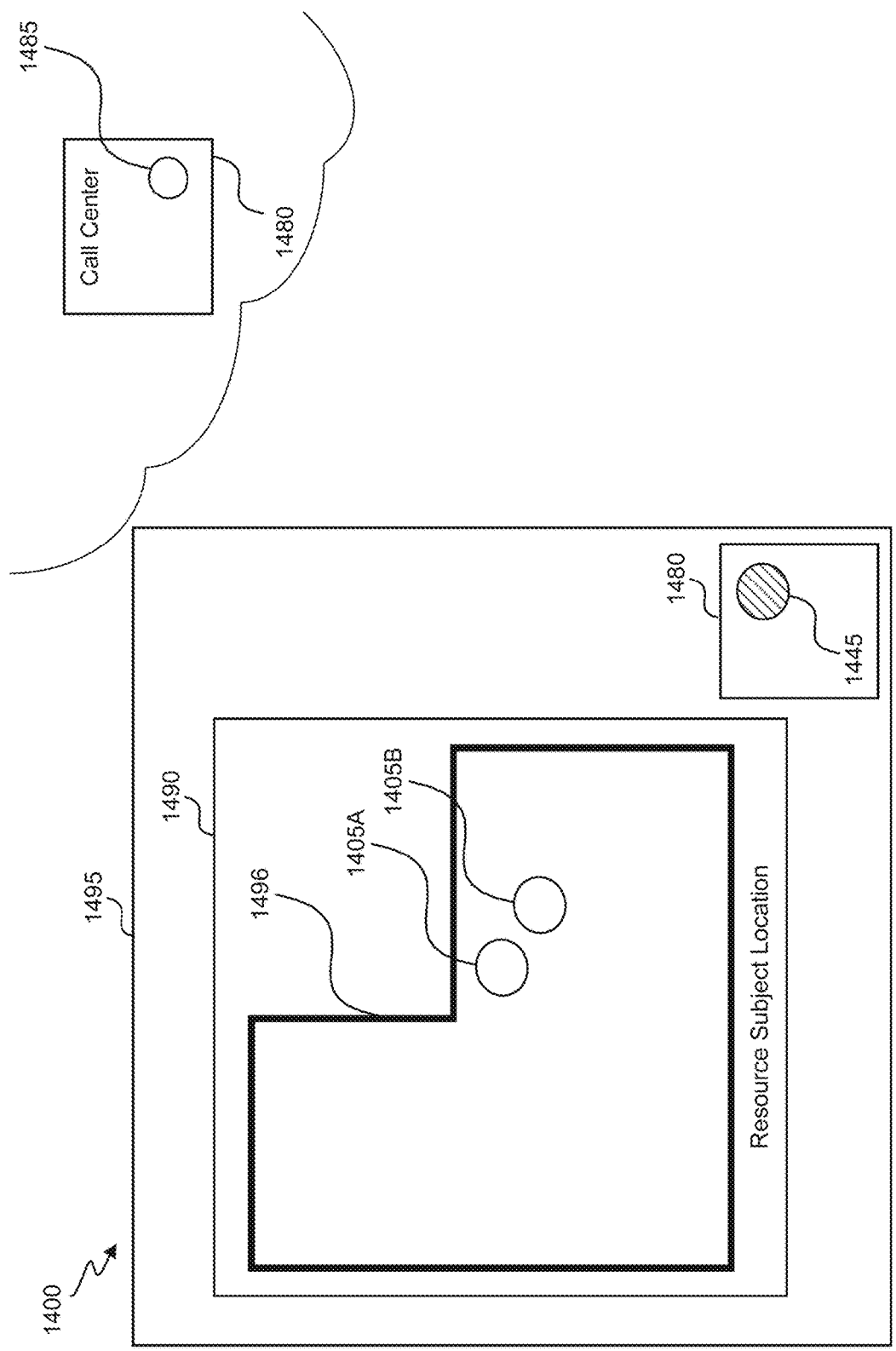
FIG. 14 illustrates an interaction environment pertinent to request processing according to one embodiment.

FIG. 14 is a block diagram of an interaction environment 1400 pertinent to request processing according to one embodiment. The environment 1400 includes object 1450 and resource 1405 inside building 1496. User 1445 is identified as being in user location 1480 and building 1496 is identified as being inside object location 1490. In this example, both user location 1480 and object location 1490 are within locality 1495.

In an example, shown in FIG. 14, user 1445 requires more information about requested performances provided in building 1496. In this example, resources 1405A-B are agents who can provide information about the requested performances or provide the requested performances. In this example, building 1496 is an object. In this example, the user 1445 is in the same locality 1495 as building 1496.

As used herein, a locality may include a geographical region or other suitable location accessible by user 1445. Like other embodiments discussed herein, user 1445 can receive an indication of prioritized "in-building" resources (e.g., resources 1405A-B) with this embodiment, but an additional type of resource is also available with the example shown on FIG. 14. In this embodiment, a call center 1485 is an office set up to handle a large volume of electronic communication (e.g., telephone calls, emails, chats, and other suitable types of electronic communication). For example, a call center resource 1485 in call center 1480 can receive communications from users in geographically-diverse areas. The call center can be linked to resources tasked to respond to inquiries over a communication link (e.g., over the phone).

In this example, resource prioritization system identifies object location 1490 as being a location having resources to provide user 1445 with requested information, but, in addition, call center 1480 is also identified as a location having resources that can respond to user 1445's inquiry. In some instances, it can first be identified which of resources 1405A, 1405B and 1485 are available (or are likely to be available within a time range), and each available resource can then be assigned a prioritization value (e.g., based on whether the resource is in a same locality as user location 1480, a degree of proficiency related to a request subject, and/or obtainment parameters associated with the resource. In one instances, a resource with a highest prioritization value may be assigned the request. In another instance, each resource with a prioritization value above a threshold may be provided with a notification that allows the resource to acknowledge request assignment, and a first to respond may receive the assignment. In some instances, an assignment is further conditioned on a determination as to whether (and/or a number of) other requests may be forthcoming. For example, it may be determined that a request is not to be assigned to a resource having a highest prioritization value due to a determination that another request communication that will be associated with another obtainment parameter will be received at a time at which the request is still being processed.

It should be appreciated that the environment 1400 may have other components than those depicted. Further, the embodiment shown in the figure is only one example of an environment that may incorporate an embodiment of the invention. In some other embodiments, the environment 1400 may have more or fewer components than shown in the figure, may combine two or more components, or may have a different configuration or arrangement of components.

Figure 15:
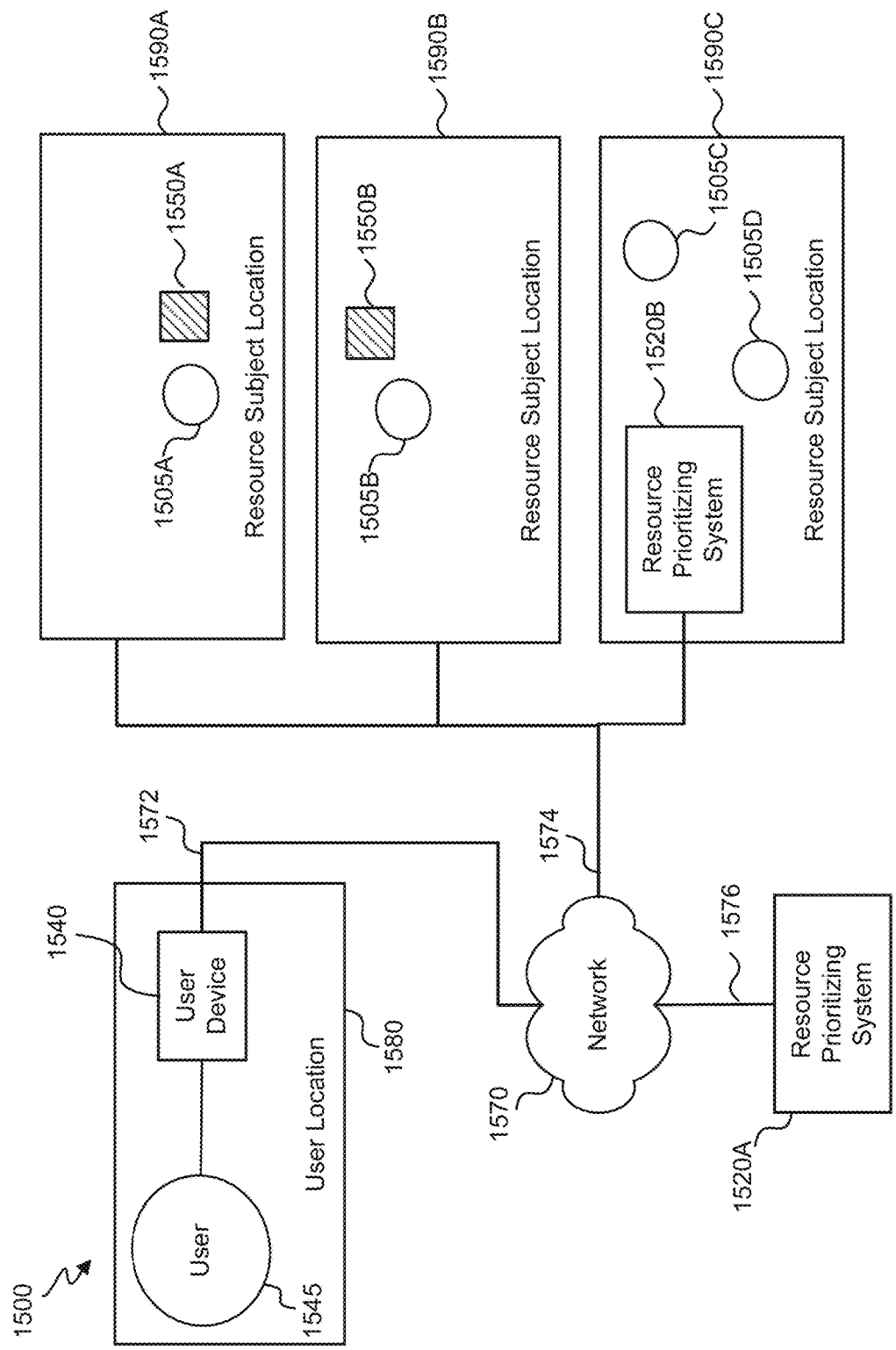
FIG. 15 illustrates an interaction environment pertinent to request processing according to one embodiment.

FIG. 15 is a block diagram of an interaction environment 1500 pertinent to request processing according to one embodiment. The environment 1500 includes user 1545, user device 1540, resource prioritizing systems 1520A-B, resource 1505A-D and objects 1550A-B. Resource prioritizing system 1520A is coupled to devices and/or systems at object locations 1590A-C via network 1570 and data paths 1574 and 1576. User device 1540 is coupled to network 1570 using data path 1572.

In one illustrative example, user 1545 is at a dwelling house (e.g., user location 980). User 1545 may be accessing a URL about a particular object, being provided by a particular client. Upon detecting access to the URL, user device 1540 can generate and transmit a request communication that identifies the client, object, user location and user device identifier.

Resources 1505A-D are agents of the client that provides the objects, and these resources can provide information relating to this object (e.g., provide more information). One type of support that can be provided by resources 1505A-D to user 1545 is providing particular information about different types of objects (e.g., size, features, colors available, availability, attributes, requested performances, and/or other suitable information about the object). In this example, the particular object is an object 1550A-B. In this example, each of object locations 1590A-C is one of the particular entities.

In this embodiment, an additional resource prioritizing system 1520B is shown at object location 1590C. In this embodiment, resource prioritizing system 1520B is located (e.g., components installed on a server, linked computing devices, or other suitable system installation options), at object location 1590C. It should be appreciated that different embodiments may have more than one resource prioritizing system 1520A-B, and that these can be located in different locations, and controlled by different entities. For example, resource prioritizing system 1520A is operated by a client that provides a requested performance using embodiments to firms. Resource prioritizing systems (e.g., resource prioritizing system 1520B) may also be operated by the firms at object locations 1590A-C, and can provide requested performances using embodiments described herein.

An example of resource prioritizing systems 1520A-B evaluating resources from multiple object locations 1590A-C is shown in FIG. 15. In this example, user 1545, at a geographic location (user location 1580) may be unaware of the different object locations 1590A-C available to them. To provide resources to user 1545, resource prioritizing system 1520A may evaluate the differences of resources available at different locations.

Some embodiments can identify object locations 1590A-C, identify the resources available among the object locations, and prioritize these identified resources 1590A-D. Object locations 1590A-C may have different characteristics (e.g., number of resources 1505A-D available at each location, or other suitable characteristics). For example, object location 1590C does not have the object. In some embodiments, availability levels are another factor that can influence resource location selection (e.g., by a resource location selection engine and/or a resource prioritization system).

Object location 1590C also has more resources available (e.g., resources 1505C-D) than object locations 1590A-B. Given the description herein, it would be appreciated that variations of selection and prioritizing factors discussed herein can be used, as well as other usable factors not discussed, but within the scope and spirit of embodiments discussed herein.

In one example, resources 1505A-B may be prioritized higher than resources 1505C-D at least because resources 1505A-B are at locations which have respective objects 1550A-B available (object locations 1590A-B). Continuing this example, resource 1505A may be prioritized higher than resource 1505B at least because object location 1590A is more proximate to user location 1580 than object location 1590B. Based on this prioritization, one or both of resource prioritizing systems 1520A-B can select resource 1505A, and this selection facilitates a direct communication channel between resource 1505A and user 1545.

It should be appreciated that the environment 1500 may have other components than those depicted. Further, the embodiment shown in the figure is only one example of an environment that may incorporate an embodiment of the invention. In some other embodiments, the environment 1500 may have more or fewer components than shown in the figure, may combine two or more components, or may have a different configuration or arrangement of components.

Figure 16:
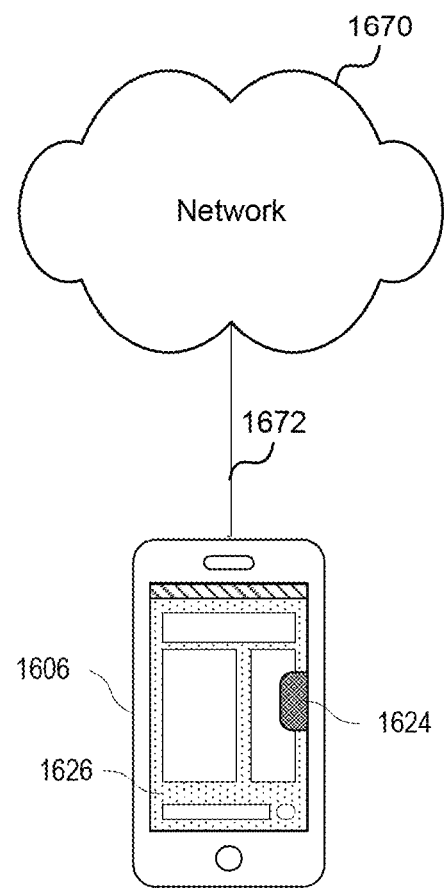
FIGS. 16-17 show exemplary device interfaces in accordance with an embodiment of the invention.
Figure 17:
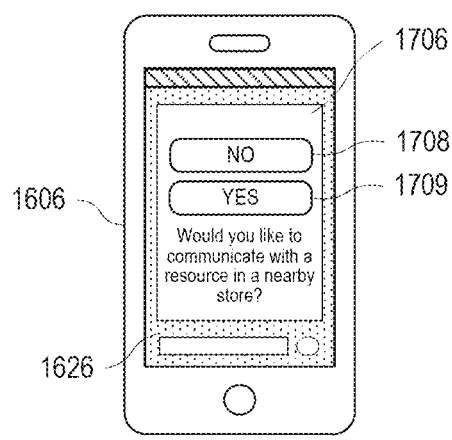

FIGS. 16-17 show exemplary device interfaces in accordance with an embodiment of the invention. As shown in FIG. 16, an environment 1600 includes a user device 1606 connected to network 1670 using connection 1672. User device 1606 may include, for example, a computing device, such as a mobile device, a desktop computer, a laptop computer, a tablet computer, a wearable electronic device, or any other suitable computing device.

User device 1606 may include a web browser (e.g., Microsoft Explorer™, Firefox™, Google Chrome™, or other suitable web browser) that can execute a hyper-text markup language (HTML) file to access a URL and display content of the accessed URL and/or an app installed that can present app-controlled content (which may be received from one or more servers) via one or more app pages. An app may include an application executed using a processor of the user device to execute a particular function or program. In a particular example, the webpage may be received or downloaded from a web server. As discussed above, some embodiments allow a device (e.g., user device 710) to be used to inquire about a subject (e.g., a particular object) using a resource request. One example of this is a situation where user device 1606 is used to provide information about objects, such as water heaters. A web browser can be used on device 1606 to execute an application that can provide more information.

In this example, the web browser is directed to a website for a client associated with a particular object. In this example, graphical interface 1626 displays the client's website. This example uses a web browser accessing a web based application, but it would be appreciated, given the description herein, that a native application installed on user device 1606 could also be used to implement features described in this example.

Continuing this example, while navigating the hardware store website and viewing information about water heaters, a communication interface overlay tab 1624 may be displayed with the graphical interface 1626. Communication interface overlay tab 1624 may be interactive and may run live along with the web browser on user device 1606. In some embodiments, communication interface overlay tab 1624 may become visible after a specific input is received using an input device of user device 1606, such as a specific key combination on a keypad or keyboard of user device 1606, a specific swiping movement or multi-touch input on a touchscreen or touchpad of user device 1606, or other specific input. In this embodiment, selecting communication overlay tab 1624 initiates a resource prioritization selection process described herein.

In some instances, one or more rules are evaluated (e.g., that process a factor, such as a device specific attribute or content of a URL being presented) to identify a desired web code that determines whether communication overlay tab 1624 is presented and/or one or more characteristics of communication overlay tab 1624. Exemplary rules and rule implementations are disclosed in U.S. Application No. 62/048,022, filed on Sep. 9, 2014, which is hereby incorporated by reference in its entirety for all purposes. U.S. Application No. 62/064,254, filed on Oct. 5, 2014, discloses various overlay element characteristics and techniques for identifying overlay element characteristics. This application is also hereby incorporated by reference in its entirety for all purposes. For example, communication overlay tab 1024 can be interactive and/or is an interactive chat window.

In this example, selecting communication overlay tab 1624, can cause a request communication to be generated that identifies the XYZHardware.com website (and/or associated) client and an indication that water heaters are to be an object for the request. The request communication can be transmitted over network 1670 to a resource prioritizing system.

Once a resource has been identified for the request communication, an interface screen 1706 (shown in FIG. 17) can be displayed to enable a user to confirm that resource communication is desired. In an example, interface screen 1706 displays a prompt: "Would you like to communicate with a resource in a nearby store?", and a no button 1708 and a yes button 1709 can be displayed. Actions to establish a direct communication channel between user device 1606 and the selected resource device can be conditioned upon detection of yes button 1709. In another embodiment, the resource prioritization and selection process is initiated after yes button 1709 is selected.

Figure 18:
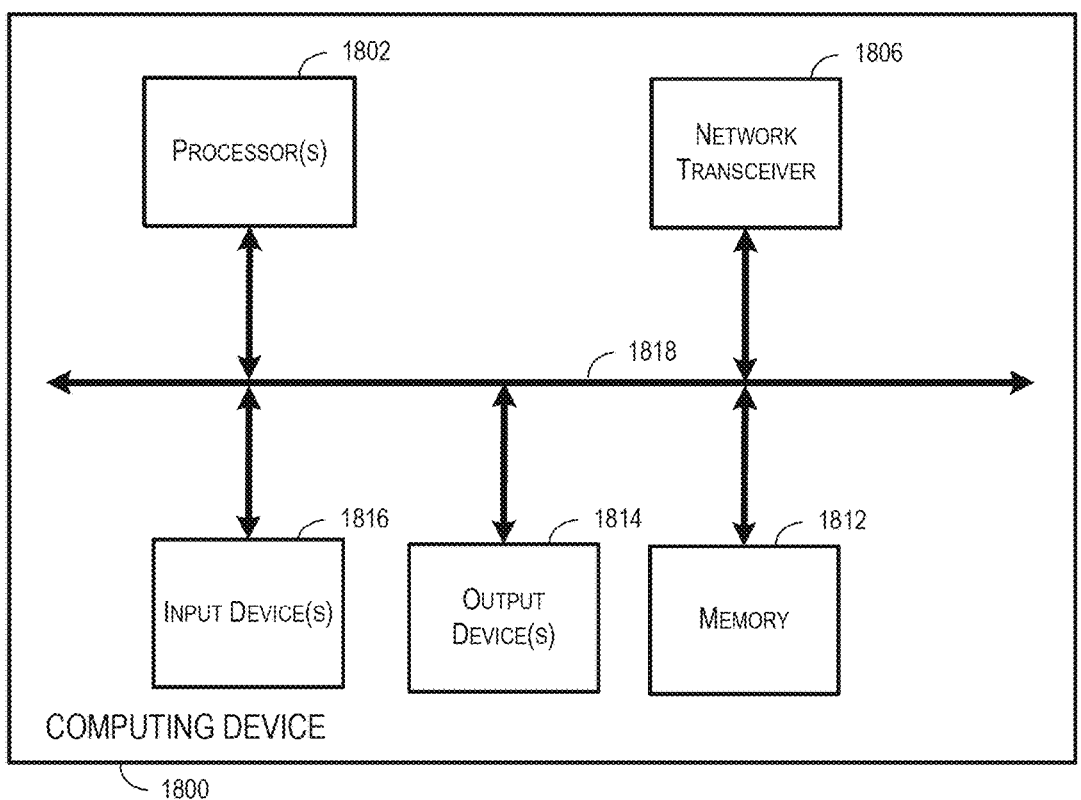
FIG. 18 shows a block diagram of a computing device (e.g., user device, resource device or resource prioritizing system device) according to an embodiment of the invention.

FIG. 18 shows a block diagram of a computing device (e.g., user device, resource device or resource prioritizing system device) 1800 according to an embodiment of the invention. Computing device 1800 may include any human-to-machine interface with network connection. Computing device 1800 can have capability that allows accessing of a webpage or URL (uniform resource locator). For example, computing device 1800 may include a cellular telephone, a smartphone, a desktop computer, a laptop computer, a tablet, a personal digital assistant (PDA), or any other suitable device. Computing device 1800 can include hardware elements that can be electrically coupled using a bus 1818 (or may otherwise be in communication, as appropriate). In one embodiment, bus 1818 can be used for processor(s) 1802 to communicate between cores and/or with memory 1812. The hardware elements may include one or more processors 1802, including without limitation one or more special-purpose processors (such as digital signal processing chips, graphics acceleration processors, and/or the like); one or more input devices 1816, which can include without limitation a camera, a mouse, a keyboard, a touch sensitive screen, a touch pad, a keypad, and/or the like; and one or more output devices 1814, which can include, without limitation, a display, a printer, and/or the like.

Computing device 1800 may include one or more network transceivers 1206 connected to bus 1818. network transceiver 1806 may be operable to send and/or receive signals across a network connection, such as to and/or from a cloud or the Internet.

Computing device 1800 may further include (and/or be in communication with) one or more non-transitory machine-readable storage mediums or storage devices (e.g., memory 1812), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more computer-programs, such as instructions or code, in memory 1812, such as RAM, ROM, FLASH, or disc drive, and executed by processor(s) 1802. Computing device 1800 can also comprise software elements (e.g., located within memory 1212), including, for example, an operating system, device drivers, executable libraries, and/or other code, such as one or more application programs, which may comprise computer programs implementing various functions. Such functions or code may include code to perform the actions described herein. Memory 1812 may be a non-transitory machine-readable storage medium, processor-readable memory, and/or a computer-readable memory that stores the one or more computer-programs configured to cause processor(s) 1802 to perform the various functions. In other embodiments, the various functions described may be performed in hardware.

It will be appreciated that a particular computing device may include fewer or additional components as compared to those depicted in FIG. 18. It will also be appreciated that a non-transitory machine-readable storage, such as the memory 1812, may store code or instructions to be executed by processor(s) and that, when executed, will perform one or more actions described herein. In some cases, the storage medium might be incorporated within a computer system. In other embodiments, the storage medium might be separate from a computer system (e.g., a removable medium, such as a compact disc), and/or provided in an installation package, such that the storage medium can be used to program, configure and/or execute the instructions/code stored thereon. These instructions of one or more computer-programs might take the form of executable code, which is executable by computing device 1800 and/or might take the form of source and/or installable code, which, upon compilation and/or installation on the computing device 1800 (e.g., using any of a variety of generally available compilers, installation programs, compression/decompression utilities, etc.) then takes the form of executable code.

Thus, certain embodiments relate to processing request communications and identifying resources well-suited to facilitate responding to the requests. This coordinated approach can reduce a load on a system if users were left to themselves to attempt to coordinate handling of their requests. For example, users may instead consume time with multiple resources in an effort to identify one well-positioned to respond to a request. As another example, users may overburden servers in an effort to handle queries for data independently. Thus, an efficiency of a system can be improved. Further, by introducing obtainment parameters into request handling, efficient resource allocation can be performed and obtainment outcomes can be improved or optimized.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be implemented.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

While illustrative embodiments of the application have been described in detail herein, it is to be understood that the inventive concepts may be otherwise variously embodied and employed, and that the appended claims are intended to be construed to include such variations, except as limited by the prior art.

What is claimed is:

1. A resource prioritization system, the resource prioritization system comprising:

an interface engine system that receives a request communication, wherein when the request communication is received from a computing device, the request communication includes location data and request content data, and wherein the request content data corresponds to an object;
a location detection engine that determines a request location based on the location data, wherein the request location indicates a location of the computing device;
an object engine that:
identifies the object based on the request content data; and
identifies an object location based on the object;
a scheduling engine that, using one or more processors:
identifies one or more candidate resource devices, wherein a candidate resource device is operable by an agent available to communicate with the computing device;
dynamically identifies resource locations associated with the one or more candidate resource devices;
dynamically compares resource locations associated with the one or more candidate resource devices with the object location associated with the object, wherein dynamically comparing includes continuously determining resource locations associated with the one or more candidate resource devices, and wherein comparing includes evaluating a proximity between the object location and the resource locations;
dynamically assigns a prioritization value to the one or more candidate resource devices, wherein the prioritization value is determined based on the comparison;
selects a resource device from the one or more candidate resource devices, wherein the resource device is selected to respond to the request communication, and wherein the selection of the resource device is based on the assigned prioritization values; and
facilitating a communication channel between the selected resource device and the computing device, wherein the communication channel enables the selected resource device to communicate with the computing device using a communication modality.

2. The resource prioritization system of claim 1, wherein the prioritization value assigned to the one or more candidate resource devices depends on a separation distance between the resource location associated with the resource and the object location.

3. The resource prioritization system of claim 1, wherein at least one of the selection of the resource device is based on a request load.

4. The resource prioritization system of claim 1, further comprising:
a resource tracking engine that dynamically updates an availability indication of the selected resource device, wherein the update is performed based on one or more new communications received at the interface engine, and wherein a new selection of the resource device to at least partly respond to a new request communication is inhibited when the availability indication is indicative of a resource device performing a task related to handling of the request communication.

5. The resource prioritization system of claim 1, wherein the prioritization value assigned to the one or more candidate resource devices depends on a degree to which a specification or base of information of the resource corresponds to the object.

6. The resource prioritization system of claim 1, wherein the selection of the resource device depends on a separation distance between the request location and the object location.

7. The resource prioritization system of claim 1, wherein the request content data includes an identifier of a webpage or app page.

8. A computer-implemented method comprising:
receiving a request communication, wherein when the request communication is received from a computing device, the request communication includes location data and request content data, and wherein the request content data corresponds to an object;
determining a request location based on the location data, wherein the request location indicates a location of the computing device;
identifying the object based on the request content data;
identifying, using one or more processors, an object location based on the object;
identifying one or more candidate resource devices, wherein a candidate resource device is operable by an agent available to communicate with the computing device;
dynamically identifying resource locations associated with the one or more candidate resource devices;
dynamically comparing resource locations associated with the one or more candidate resource devices with the object location associated with the object, wherein dynamically comparing includes continuously determining resource locations associated with the one or more candidate resource devices, and wherein comparing includes evaluating a proximity between the object location and the resource locations;
dynamically assigning a prioritization value to the one or more candidate resource devices, wherein the prioritization value is determined based on the comparison;
selecting, using the one or more processors, a resource device from the one or more candidate resource devices, wherein the resource device is selected to respond to the request communication, and wherein the selection of the resource device is based on the assigned prioritization values; and
facilitating a communication channel between the selected resource device and the computing device, wherein the communication channel enables the selected resource device to communicate with the computing device using a communication modality.

9. The computer-implemented method of claim 8, wherein the prioritization value assigned to the one or more candidate resource devices depends on a separation distance between the resource location associated with the resource and the object location.

10. The computer-implemented method of claim 8, wherein at least one of the selection of the resource device is based on a request load.

11. The computer-implemented method of claim 8, further comprising:
dynamically updating an availability indication of the selected resource device, wherein the update is performed based on one or more new communications received, and wherein a new selection of the resource device to at least partly respond to a new request communication is inhibited when the availability indication is indicative of a resource device performing a task related to handling of the request communication.

12. The computer-implemented method of claim 8, wherein the prioritization value assigned to the one or more candidate resource devices depends on a degree to which a specification or base of information of the resource corresponds to the object.

13. The computer-implemented method of claim 8, wherein the selection of the resource device depends on a separation distance between the request location and the object location.

14. The computer-implemented method of claim 8, wherein the request content data includes an identifier of a webpage or app page.

15. A computer-program product tangibly embodied in a non-transitory machine-readable storage medium, including instructions configured to cause one or more data processors to perform actions including:

receiving a request communication, wherein when the request communication is received from a computing device, the request communication includes location data and request content data, and wherein the request content data corresponds to an object;

determining a request location based on the location data, wherein the request location indicates a location of the computing device;

identifying the object based on the request content data;

identifying an object location based on the object;

identifying one or more candidate resource devices, wherein a candidate resource device is operable by an agent available to communicate with the computing device;

dynamically identifying resource locations associated with the one or more candidate resource devices;

dynamically comparing resource locations associated with the one or more candidate resource devices with the object location associated with the object, wherein dynamically comparing includes continuously determining resource locations associated with the one or more candidate resource devices, and wherein comparing includes evaluating a proximity between the object location and the resource locations;

dynamically assigning a prioritization value to the one or more candidate resource devices, wherein the prioritization value is determined based on the comparison;

selecting, using the one or more processors, a resource device from the one or more candidate resource devices, wherein the resource device is selected to respond to the request communication, and wherein the selection of the resource device is based on the assigned prioritization values; and facilitating a communication channel between the selected resource device and the computing device, wherein the communication channel enables the selected resource device to communicate with the computing device using a communication modality.

16. The computer-program product as recited in claim 15, wherein the prioritization value assigned to the one or more candidate resource devices depends on a separation distance between the resource location associated with the resource and the object location.

17. The computer-program product as recited in claim 15, wherein at least one of the selection of the resource device is based on a request load.

18. The computer-program product as recited in claim 15, further comprising:

dynamically updating an availability indication of the selected resource device, wherein the update is performed based on one or more new communications received, and wherein a new selection of the resource device to at least partly respond to a new request communication is inhibited when the availability indication is indicative of a resource device performing a task related to handling of the request communication.

19. The computer-program product as recited in claim 15, wherein the prioritization value assigned to the one or more candidate resource devices depends on a degree to which a specification or base of information of the resource corresponds to the object.

20. The computer-program product as recited in claim 15, wherein the selection of the resource device depends on a separation distance between the request location and the object location.

* * * * *